(12) United States Patent
Griffioen et al.

(10) Patent No.: US 7,992,685 B2
(45) Date of Patent: Aug. 9, 2011

(54) OPTICAL CABLE LUBRICATOR WITH RESERVOIR

(75) Inventors: Willem Griffioen, Ter Aar (NL);
Cornelis van't Hul, Den Hoorn (NL);
Willem Greven, Delfzijl (NL); Patrick Menno Versteeg, Katwijk aan Zee (NL);
Maja Keijzer, Delft (NL)

(73) Assignee: Draka Comteq B.V. (NL)

( * ) Notice: Subject to any disclaimer, the term of this patent is extended or adjusted under 35 U.S.C. 154(b) by 1670 days.

(21) Appl. No.: 11/271,504

(22) Filed: Nov. 12, 2005

(65) Prior Publication Data

US 2006/0102430 A1    May 18, 2006

Related U.S. Application Data

(60) Continuation-in-part of application No. 10/990,704, filed on Nov. 17, 2004, now Pat. No. 7,021,426, which is a division of application No. 10/194,034, filed on Jul. 11, 2002, now Pat. No. 6,848,541.

(51) Int. Cl.
*F16N 7/24* (2006.01)
(52) U.S. Cl. .................................................. 184/15.1
(58) Field of Classification Search ............... 184/15.1, 184/15.2; 254/134.4
See application file for complete search history.

(56) References Cited

U.S. PATENT DOCUMENTS

| | | | |
|---|---|---|---|
| 3,916,925 A | 11/1975 | Crump | |
| 4,185,809 A | 1/1980 | Jonnes | |
| 4,331,322 A | 5/1982 | Woodruff | |
| 4,468,003 A | 8/1984 | Nonclercq et al. | |
| 4,569,420 A | 2/1986 | Pickett et al. | |
| 4,749,059 A * | 6/1988 | Jonnes et al. | 184/15.1 |
| 4,822,005 A | 4/1989 | Aleshire | |
| 4,934,662 A | 6/1990 | Griffioen et al. | |
| 5,121,901 A | 6/1992 | Cassidy et al. | |
| 5,467,968 A | 11/1995 | Proud et al. | |
| 5,645,267 A | 7/1997 | Reeve et al. | |

(Continued)

FOREIGN PATENT DOCUMENTS

DE    42021474 A1    7/1993

(Continued)

*Primary Examiner* — Michael Mansen
*Assistant Examiner* — Robert Reese
(74) *Attorney, Agent, or Firm* — Scott T. Griggs; Dennis T. Griggs; Griggs Bergen LLP

(57) ABSTRACT

A cable is installed in a duct by means of blowing (and, optionally, synergetic pushing) and lubricating the cable during field installation. Lubricating the cable is done after the cable exits from the cable blowing equipment and hence takes place in a pressurized airflow passage. Lubricant supplied from an external reservoir drains into a pressurized lubricator space through which the cable moves. Foam-plugs seal the entrance and the exit of the lubricator space. The cable is wetted by the lubricant as it moves through the lubricator space, and excess lubricant is wiped by the foam plug, leaving only a thin film of lubricant on the cable as it moves out of the lubricator. In one embodiment, the lubricator is fitted with a single wiping member in the form of an annular plug of open cell foam material, and the cable passes through laterally opposite sections of the annular plug. The lubricator housing is formed in mating sections, and the internal lubricator is also formed in mating sections. The lubricator is integrated with cable blowing equipment in one embodiment. A bundle of guide tubes is lubricated in another embodiment.

10 Claims, 12 Drawing Sheets

U.S. PATENT DOCUMENTS

| | | |
|---|---|---|
| 5,699,996 A | 12/1997 | Boyle et al. |
| 5,732,934 A * | 3/1998 | Sano et al. ................. 254/134.4 |
| 5,884,384 A | 3/1999 | Griffioen |
| 5,946,788 A | 9/1999 | Griffioen et al. |
| 5,950,298 A | 9/1999 | Griffioen et al. |
| 5,971,035 A | 10/1999 | Griffioen |
| 6,024,387 A | 2/2000 | Griffioen |
| 6,047,954 A | 4/2000 | Griffioen |
| 6,089,546 A | 7/2000 | Griffioen et al. |
| 6,115,937 A | 9/2000 | Griffioen |
| 6,116,578 A * | 9/2000 | Pruett ........................ 254/134.4 |
| 6,129,341 A * | 10/2000 | Griffioen et al. ........... 254/134.4 |
| 6,173,107 B1 | 1/2001 | Reeve et al. |
| 6,311,953 B1 | 11/2001 | Lang et al. |
| 6,328,283 B1 | 12/2001 | Reeve et al. |
| 6,176,022 B1 | 1/2002 | Willem |
| 6,364,290 B1 | 4/2002 | Barker |
| 6,402,123 B1 * | 6/2002 | Rivard ....................... 254/134.4 |
| 6,405,998 B1 * | 6/2002 | Griffioen ................... 254/134.4 |
| 6,848,541 B2 * | 2/2005 | Griffioen et al. ............. 184/15.2 |
| 7,021,426 B2 * | 4/2006 | Griffioen et al. ............. 184/15.2 |

FOREIGN PATENT DOCUMENTS

| | | |
|---|---|---|
| FR | 2501927 | 9/1982 |
| FR | 2655783 | 6/1991 |
| JP | 2001309519 | 11/2001 |
| WO | WO9918465 A1 * | 4/1999 |
| WO | WO 01/46735 | 6/2001 |

* cited by examiner

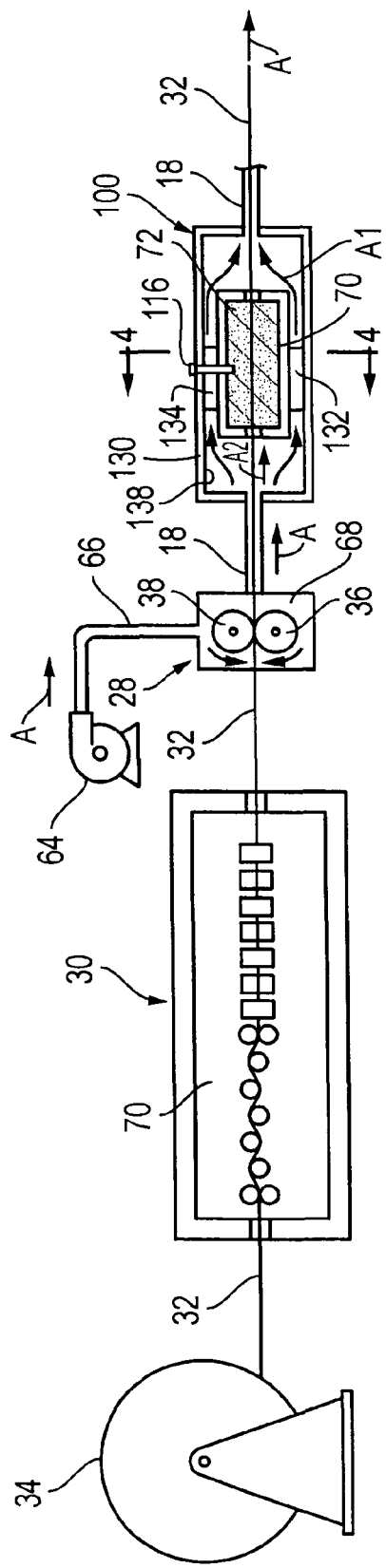
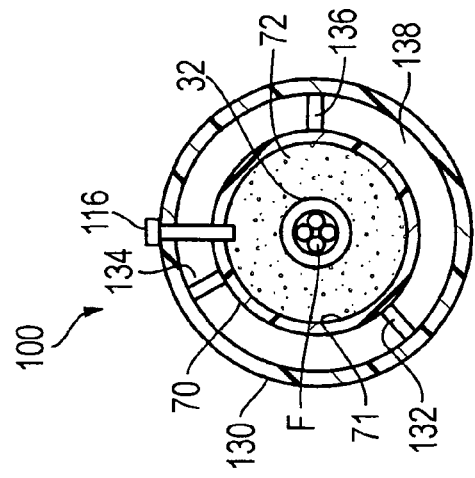
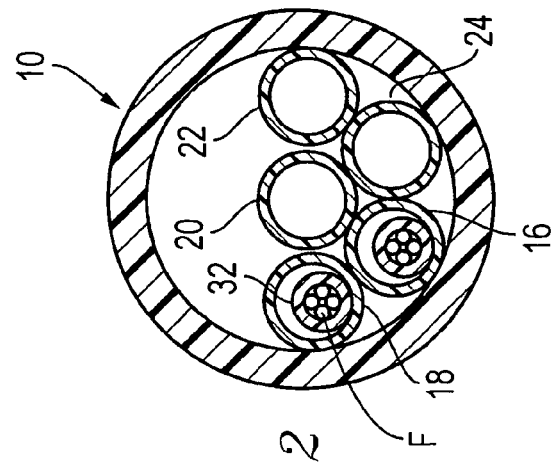
FIG. 3
FIG. 4
FIG. 2

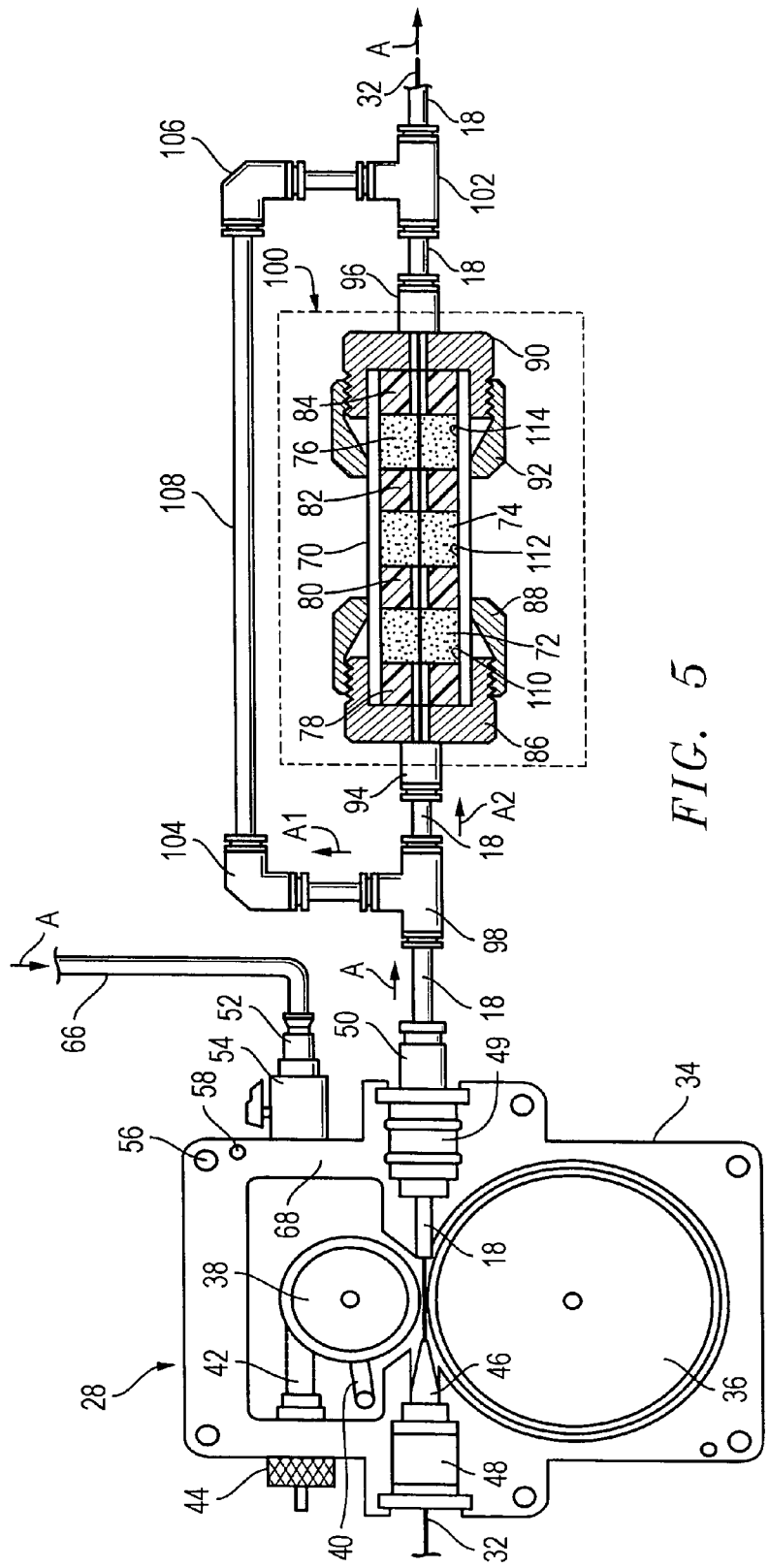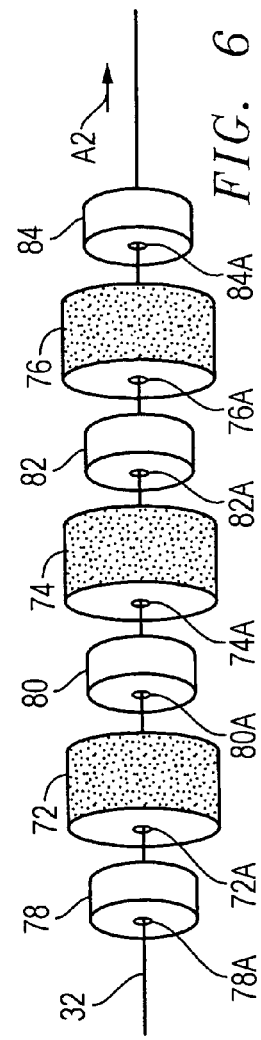

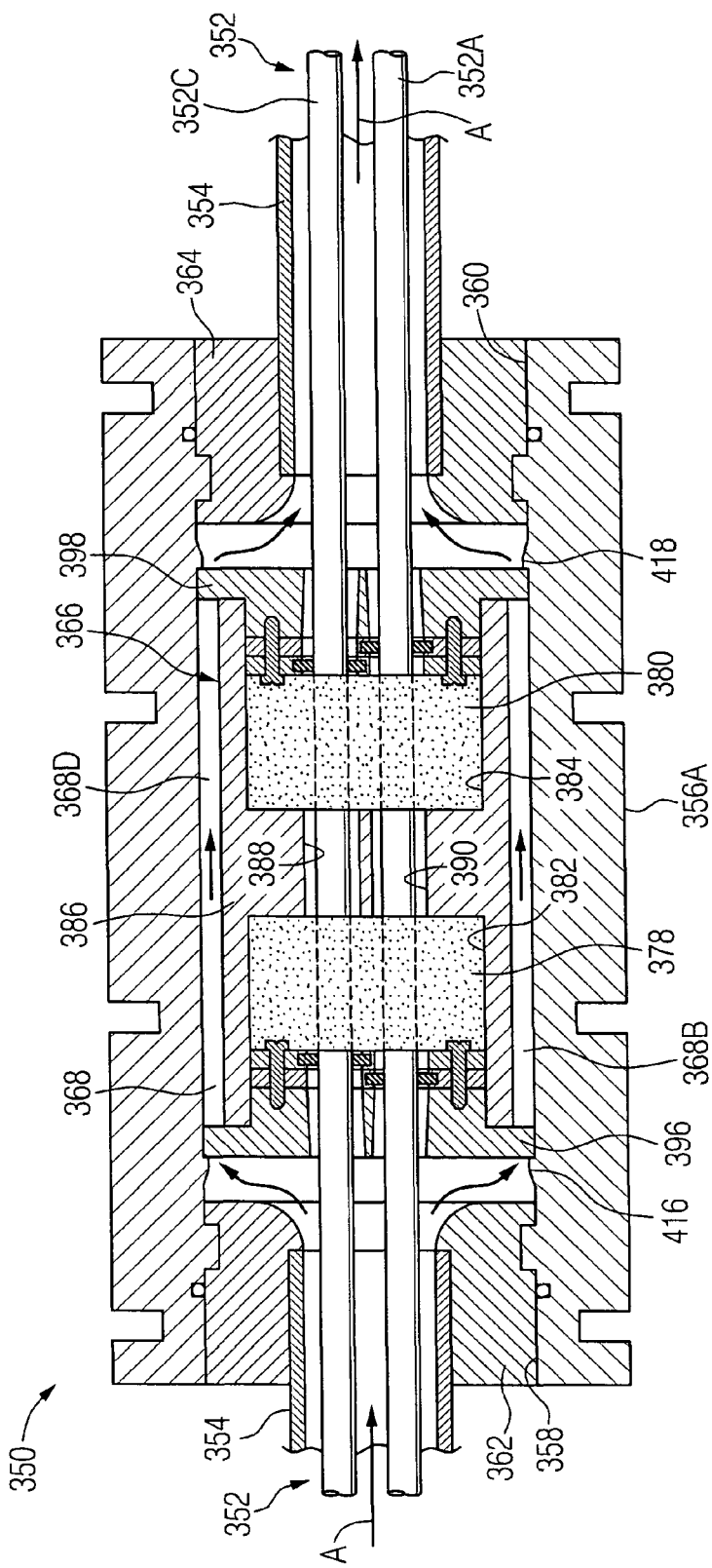
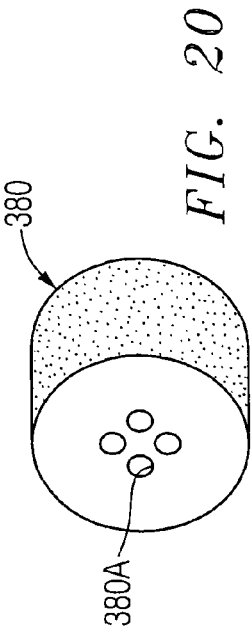
FIG. 19
FIG. 20

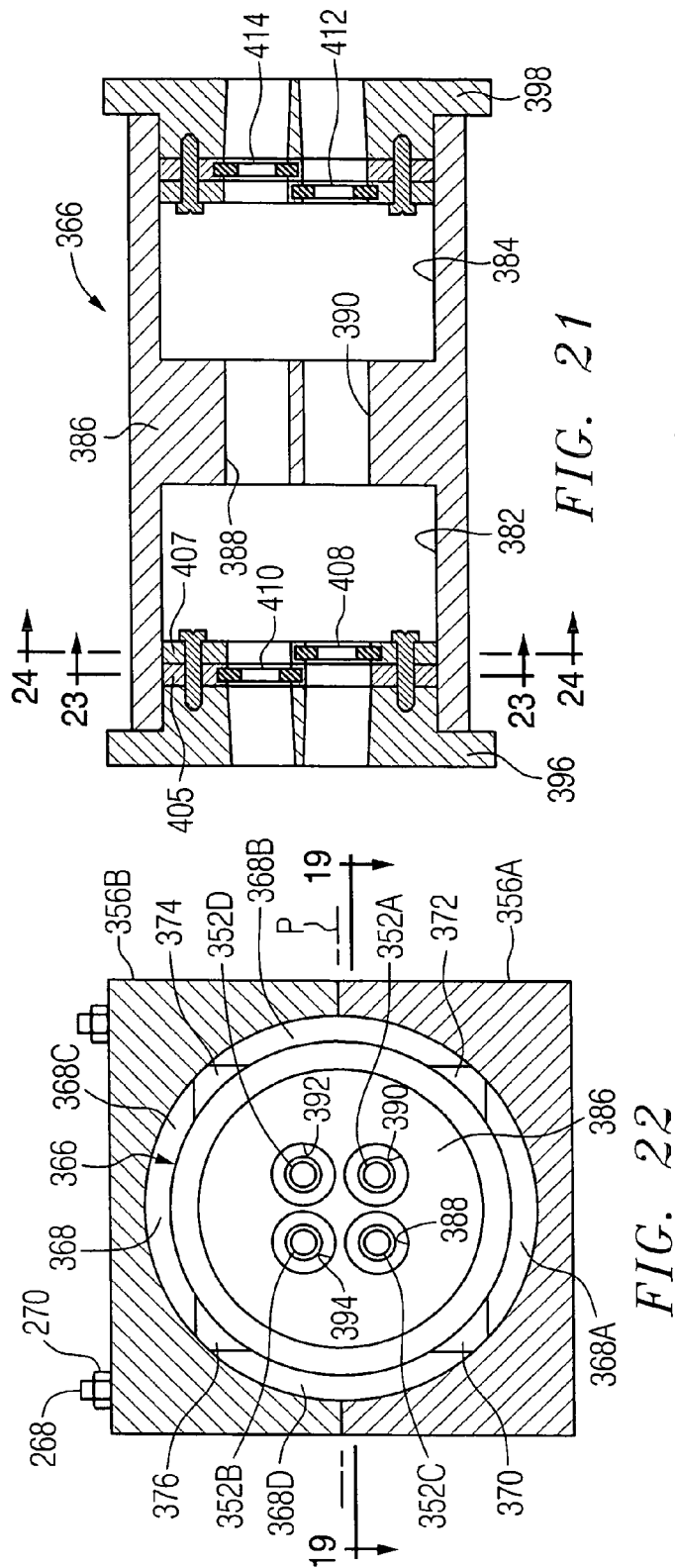
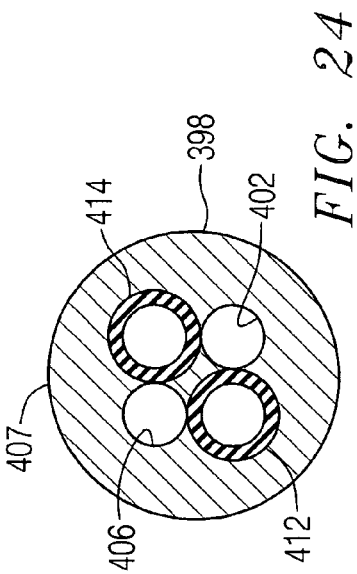
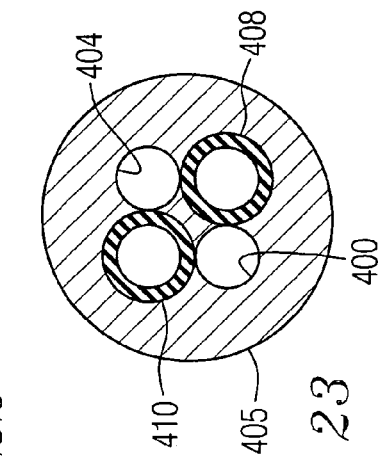
FIG. 21
FIG. 22
FIG. 23
FIG. 24

OPTICAL CABLE LUBRICATOR WITH RESERVOIR

CROSS-REFERENCE TO RELATED APPLICATIONS

This application is a continuation-in-part of U.S. application Ser. No. 10/990,704 filed Nov. 17, 2004 now U.S. Pat. No. 7,021,426, which is a divisional of U.S. application Ser. No. 10/194,034 filed Jul. 11, 2002, now U.S. Pat. No. 6,848,541, which are incorporated herein by reference.

BACKGROUND OF THE INVENTION

This invention is related generally to outside plant equipment for telecommunications networks, and in particular to lubrication apparatus for installing fiber optic communication cables and copper cables in (protective) ducts and conduits, including underground ducts and guide tubes (also called guide ducts, mini-tubes, mini-ducts or microducts) that channelize the ducts, e.g. guide tubes, subducts or protective ducts.

Various factors must be considered when a fiber optic cable is installed in a protective duct. Some major concerns are the ease of installation and reduction in the amount of time needed to install the cable. Generally, it is desirable to install the longest continuous length of cable possible to reduce the number of splices needed for the cable run. Splices are time consuming to make and incur considerable installation costs. Moreover, it is not desirable to have a large number of splice joints in view of the relatively substantial signal damping caused by each joint in proportion to the total signal damping of the overall signal path.

Protective cable ducts may be channelized in an effort to satisfy these concerns. For this purpose, one or more guide tubes whose interior surfaces may have a lower coefficient of friction than the protective duct, are installed in the protective duct, thereby establishing separate channels in which cable, optionally at a later time, can be pulled through the protective duct over a greater length.

The installation of fiber optic cables by pulling has now largely been replaced by a combination of blowing and synergetic pushing of the cables, for example as described in U.S. Pat. Nos. 4,850,569 and 4,934,662 to Griffioen et al. This method is being used now for a variety of cables and ducts, from small (4 mm optical cables in 7/5.5 mm guide tubes, and currently 1.6 mm optical fiber cables in 4/3.2 mm guide tubes) to large (35 mm copper balanced cables in 63/50 mm ducts). This method is also used to install a bundle of guide tubes in a protective duct.

The theory of this pushing and blowing technique is described in EP 0734 109 B1 (Griffioen). According to this theory, cables with only a little play in the duct can be installed over long distances. Although the stiffness of the cable contributes more to the friction when passing bends and windings (undulations) in the duct trajectory, pushing becomes more efficient because the cable has less play to develop buckling. Even so, frictional effects have limited the installation lengths attainable by pushing and blowing techniques. Improvements in cable lubrication have been made to overcome those frictional limitations.

During the early development of pushing/blowing installation, cable lubrication was done by leading the cable through a box in contact with a lubricant, e.g., paraffin oil, before entering the cable blowing equipment and the protective duct. That conventional method has two limitations: (a) the pusher wheels or capstans of most blowing equipments (most of them with the pusher wheels outside the pressurized space) slip over the cable when the cable is wet with lubricant, and (b) the seals from the cable inlet to the pressurized space scrape or blow away most of the lubricant.

For these reasons the method of lubricating a cable before it is launched has been abandoned by most operators. Instead, the duct is now lubricated before the cable is inserted. This is done by pouring a proper amount of lubricant into the duct, putting a foam plug behind and blowing the plug with lubricant through the duct. This method turned out to be a reliable and satisfactory way of lubricating conventional large diameter ducts. Another way to lubricate is pre-lubrication of the duct by the manufacturer (usually during the extrusion process).

Bundles of mini-tubes have been developed for use in telecommunications access networks, e.g., "Fiber To The Home" (FTTH) systems, for example as described in U.S. Pat. No. 6,572,081 entitled "Installation of Guide Tubes in a Protective Duct," assigned to the owner of the present application and incorporated herein by reference. Here the mini-tubes become smaller and smaller, making it more difficult to lubricate with foam-plugs. More importantly, blowing many cables from one point to many different end-locations (houses or offices), and lubricating them with a blown foam plug every time, is rather impractical. Pre-lubricated ducts (by the manufacturer) have turned out to be not always reliable. A solution to these problems is given by the present invention as follows.

SUMMARY OF THE INVENTION

The present invention consists of a serially connected lubricator with one or more wiping plugs and suitable viscous lubricant, installed in the duct downstream of pushing/blowing cable launching equipment. The lubricator operates under pressure and the airflow needed to blow the cable is bypassed into the protective duct. Guide blocks prevent buckling of the cable when pushed through the relatively large lubricating chamber. The use of guide blocks is especially important for smaller diameter cable with less stiffness.

The lubricator includes a lubrication compartment that is pressurized with airflow from the launching apparatus. One or more wiping members, for example foam plugs, are saturated with a viscous lubricant and are placed in the lubrication compartment for wiping the cable. As a cable is run through the pressurized compartment, lubricant is wiped onto the cable as it moves in contact with the foam plugs. According to another embodiment, a volume of the viscous lubricant is contained in an internal lubricant reservoir and the cable is wetted by contact with the lubricant as the cable moves through the internal reservoir. One or more wiping members, for example foam plugs or resilient gaskets, seal the internal reservoir and wipe excess lubricant from the cable as it exits from the reservoir. In yet another embodiment, the viscous lubricant is supplied from an external reservoir into an internal lubricator space, and the cable is wetted by the lubricant as it moves through the lubricator space. One or more wiping members, for example foam plugs or resilient gaskets, wipe excess lubricant from the cable as it moves through the internal lubricator space.

A lubricator, according to certain embodiments of the present invention, enhance the performance of the blowing installation of longitudinally extending members in general, including in particular optical fiber cables, copper cables, coaxial cables, balanced pair cables, power cables, guide tubes, guide ducts, mini-tubes, mini-ducts and microducts. A lubricator, according to certain embodiments of the present invention, also enhance the performance of the blowing installation of a bundle of longitudinally extending members in general, including in particular optical fiber cables, copper cables, coaxial cables, balanced pair cables, power cables, guide tubes, guide ducts, mini-tubes, mini-ducts, subducts and microducts. Both single longitudinally extending members and bundles thereof are installed in ducts, including guide tubes, guide ducts, mini-tubes, mini-ducts, subducts and protective ducts.

BRIEF DESCRIPTION OF THE DRAWINGS

FIG. 2 is a sectional view through the protective duct taken along the line 2-2.

FIG. 3 is a simplified schematic representation of cable launching equipment of FIG. 1 showing one embodiment of the cable lubricator.

FIG. 4 is a sectional view through the lubricator taken along the line 4-4.

FIG. 5 is a simplified elevational view, partly in section, of conventional cable pushing/blowing equipment and an alternative embodiment of the lubricator shown in FIG. 1, with airflow bypass.

FIG. 6 is an exploded perspective view of the internal components of the lubricator shown in FIG. 5.

FIG. 19 is a sectional view of a bundle lubricator, taken along the line 19-19 of FIG. 22.

FIG. 20 is a perspective view of a foam plug that is installed in the bundle lubricator of FIG. 19.

FIG. 21 is a longitudinal sectional view of an internal lubricator assembly shown removed from the external lubricator housing.

FIG. 22 is an elevational view, partly in section, showing the internal lubricator assembly installed inside and sealed within the external lubricator housing.

FIG. 23 is a sectional view, taken along the line 23-23 of FIG. 21, showing a seal assembly containing a first set of seal gaskets.

FIG. 24 is a sectional view, taken along the line 24-24 of FIG. 21, showing a seal assembly containing a second set of seal gaskets.

DETAILED DESCRIPTION OF THE PREFERRED EMBODIMENTS

The lubricator apparatus and method of the present invention may be used to install longitudinally extending members and bundles thereof in ducts, e.g., guide tubes, guide ducts, mini-tubes, mini-ducts, subducts and protective ducts. In particular, the longitudinal extending members include optical fiber cables, copper cables, coaxial cables, balanced pair cables, power cables, as well as channelizing members, for example guide tubes, guide ducts, mini-tubes, mini-ducts, subducts and microducts. Preferred embodiments of the invention will now be described on the basis of examples where cables and bundles of cables are installed in guide tubes, and guide tubes and bundles of guide tubes are installed in a protective duct.

Figure 1:
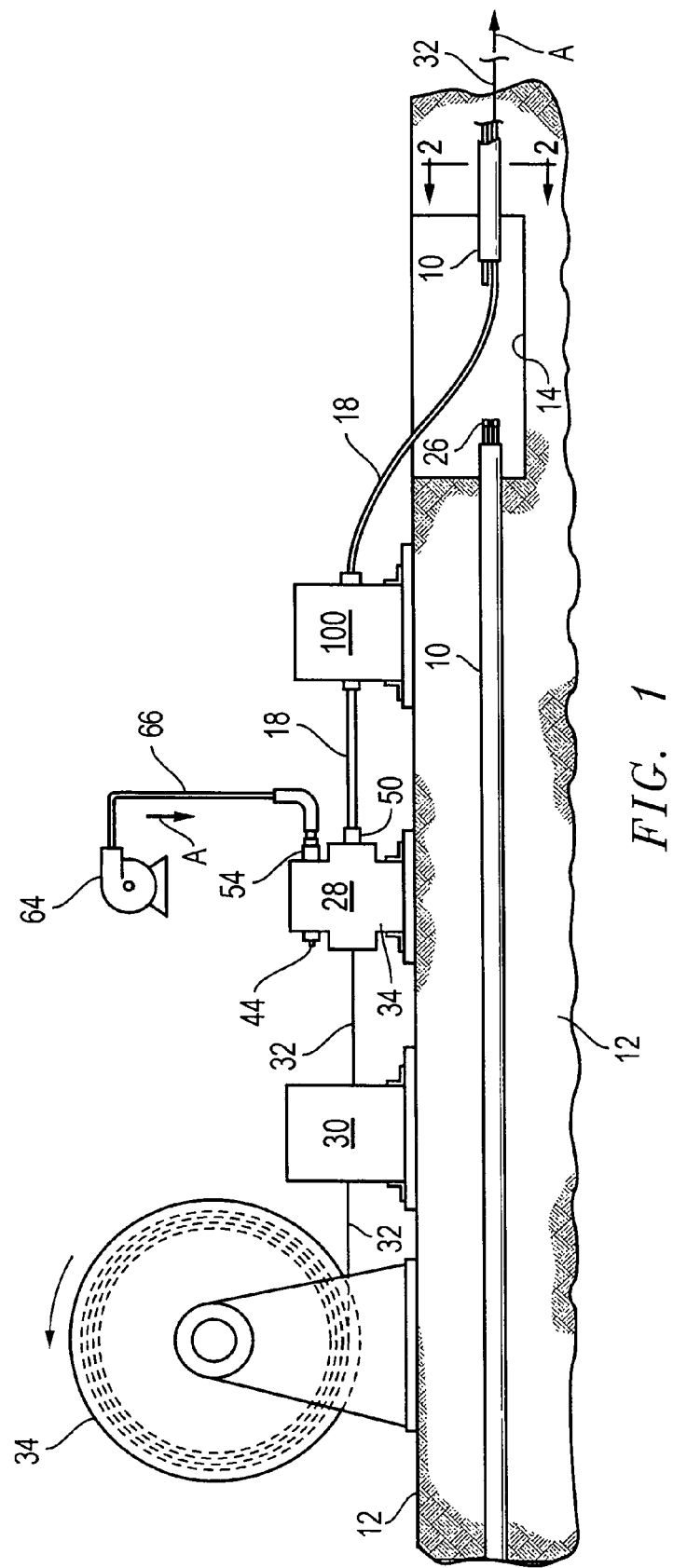
FIG. 1 is a simplified elevational view, partly in section, of a typical installation of optical fiber cable in a protective duct with cable launching equipment and a cable lubricator constructed according to the present invention.

A portion of a typical underground fiber optic conduit network is schematically shown in FIG. 1. The network includes a longitudinally extending trajectory duct 10 or conduit, typically made of a sturdy plastic material, e.g., one and a quarter, one and a half or two inches in diameter. The conduit 10 is buried in the ground 12 and is carrying small diameter guide tubes in which fiber optic cables are to be installed. The conduit 10 and its cables typically extend several thousand feet, and a launching station, such as at a hand-hole 14, is located at a pre-determined central location. Here guide-tubes 16, 18, 20, 22 and 24 extend out of the protective duct 10 (see also FIG. 2). In the hand-hole 14 also blowing/pushing equipment can be used in tandem operation. End caps 26 seal off the guide-tubes 20, 22, 24 where no cables have been installed.

A cable launching unit 28 is set up adjacent the hand-hole 14, optionally in conjunction with a cable straightener unit 30, to introduce a fiber optic cable 32 into one of the guide tubes. A supply of new fiber optic cable, usually consisting of thousands of feet, is coiled or wound on a reel 34 positioned above ground. The cable 32 is unwound from the reel and is fed into the cable-straightening unit 30.

After the straightening step, the cable is fed into the cable launching unit 28, for example, a combination pushing and blowing cable insertion equipment of the type sold by Sherman & Reilly, Inc. of Chattanooga, Tenn., or as shown in U.S. Pat. No. 4,850,569, to which reference is made for whatever details described therein as may be necessary for the full understanding of the operation of the pushing and blowing unit.

The cable 32, coming from the straightener 30, is to be inserted into the underground guide tube 18. This is done with the synergetic blowing and pushing action of the insertion unit 28. Inside the housing 34 (two sections fastened together, see FIG. 5, only the bottom section of this equipment shown) the cable 32 is pushed by means of a mechanically (electric or pneumatic) driven wheel 36 that has an outer layer of machined hard metal with a groove for engaging the cable. In order to grip the cable a second (not mechanically driven) idler wheel 38 is pushed against the drive wheel 36. Pushing of the wheel 38, which can pivot on arm 40, is done via spring 42 by turning around the adjustment wheel 44 to control the pushing force of the drive wheel 38.

The cable 32 enters the housing 34 via a conical feed-through 46 that is cut to fit exactly the cable size. This feed-through is mounted on a splittable cylindrical entrance duct 48 that makes an airtight sealing when the housing is closed. The guide-tube 18 is received in a splittable cylindrical exit duct 49 also making airtight sealing. The guide tube 18 extends into the housing 34 until almost touching the wheels, to avoid buckling. Optionally the guide tube 18 can be mounted using a push/pull connector 50. Pressurized air A is fed using a connection 52 via valve 54. The sections of the housing are closed with bolts and nuts through holes 56. For proper alignment, pin-and-holes 58 are used.

Referring again to FIG. 1, sources of compressed air and hydraulic power (or electric power) are connected to the cable feeder 28. Preferably, the compressed air A is provided by a compressor 64 through delivery conduit 66 at 175 to 375 cubic feet per minute (CFM) and 90 to 175 pounds per square inch (PSI). For the small size cables, installed in the guide tubes, in principle a capacity of 20 to 50 cubic feet per minute is sufficient.

An entrance duct clamp releasably holds the entrance duct for guiding the cable 32 toward the cable driver 36. Preferably, the entrance duct is a length of polyethylene tubing.

The air injection block 34 is provided with an entrance seal insert and an exit seal insert adapted to permit passage of the cable 32 while maintaining an airtight seal. The injection block 34, entrance seal insert and exit seal insert are each separable into two generally symmetrical halves to permit installation of the cable 32. The seal inserts are removable and replaceable with similar inserts adapted for different cable and conduit diameters. The entrance seal insert provides a passage slightly larger than the cable. A pair of gaskets is provided in the entrance seal insert to seal around the cable. A fitting 54 is provided to permit injection of compressed air into the injection block 34.

An exit duct clamp is attached to the air injection block 34 to secure the duct to the injection block. The injection block defines a plenum 68 closed by the entrance seal insert and the exit seal insert. An end portion of the guide duct 18 is releasably held in the exit duct clamp. Preferably, the guide duct 18 is a length of cylindrical polyethylene tubing. A duct seal, such as a pair of gaskets, is provided to seal around the guide duct. The exit duct clamp and duct seal the injection block and guide duct to direct passage of air from the plenum into the guide duct.

Figure 8:
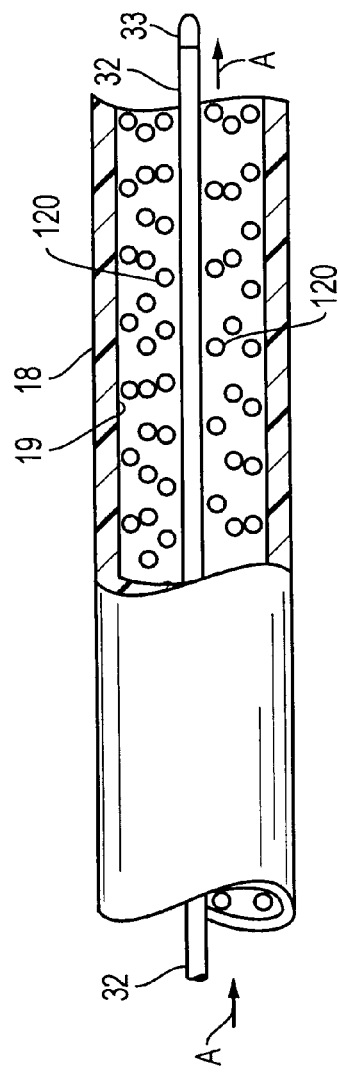
FIG. 8 is an elevation view, partly in section, of a guide tube in which lubricant droplets, produced by the lubricator of FIG. 7, are entrained as an aerosol mixture in the pressurized airflow discharged from the lubricator as the cable is inserted through the guide duct.

Referring to FIG. 1, FIG. 2 and FIG. 8, prior to installation of the cable into the guide duct 18, a leading end of the cable 32 is sealed with a smooth plug or end cap 33 having a diameter only slightly larger than that of the cable, e.g., made of brass, or other low friction material. The end cap 33 is attached to the cable preferably by a screw-threaded union, and is tapered or torpedo-shaped and rounded on end to avoid sticking of the cable in the guide tube.

To set up the cable feeder 28, as shown in FIGS. 1 and 2, a length of cable is unrolled from the reel 34 and inserted in the entrance duct 48. The cable is positioned so that it extends from the end of the entrance duct approximately the length of the cable feeder. A cable 32 with the smooth end cap is inserted into the guide duct 18. The cable feeder is positioned adjacent the cable. The drive wheels, injection block, clamps and seal inserts are separated to provide a generally horizontal passage into which the cable is transversely inserted. The separated parts are then reassembled, closed, and secured to the entrance duct, cable, and guide duct in the cable feeder.

The compressed air source, hydraulic source, and/or electric power are connected and initiated to pressurize the plenum 68 and to activate the hydraulic system and the control system. Compressed air A flows at high speed along the cable, propelling the cable through the guide duct. The actuator is switched on to provide hydraulic fluid (or compressed air or electric power) to the motors, and the drive wheels rotate, advancing the cable 32 through the conduit 18.

According to the present invention, after the cable 32 exits the cable launching equipment 28 but prior to entry into the guide tube 18 in the protective underground duct 10, the cable 32 is lubricated by running it through a pressurized lubricator unit 100 as shown in FIG. 1, FIG. 3 and FIG. 5. Field-testing has demonstrated that the coefficient of friction of rubbing engagement of the cable against a protective duct (or guide tube) is a major limiting factor in determining how far a cable can be blown-in.

Maximum blowing distance can be obtained when the blowing force equals the frictional force resisting movement of the cable. Consequently the maximum blowing distance varies substantially linearly with the coefficient of friction (through straight duct trajectories). It has been demonstrated by field testing that lubrication of the cable, under pressurized duct conditions, can substantially reduce the coefficient of friction in the duct, yielding a surprising increase in blowing distance by a factor of 10 or more as compared with the non-lubricated case.

Referring again to FIG. 1 and FIG. 2, a schematic representation is given of cable blowing equipment 28 in combination with the cable lubricator 100. The cable straightener 30 may be used in combination with relatively large cables having a large diameter (e.g., 3.9-5.0 mm) exceeding a certain minimum size, e.g., in the range of from 1.6 to 2.0 mm and smaller diameters, but is not preferred for use on the smaller cables.

In the preferred embodiment, micro-cables 32 with diameters ranging from 1.6 to 2.0 mm have been blown into guide tubes 16, 18 having an outer diameter of 4 mm. In this embodiment, each cable contains two optical fiber strands F embedded in a UV-acrylate matrix reinforced with strands of aramid yarn and enclosed in a protective polymer jacket. In an alternative embodiment, each cable contains four optical strands F and a waterproofing material, for example silicone gel or aquagel, enclosed in a protective polymer jacket.

In yet another cable embodiment, the fibers F are enclosed within a small diameter, thin sidewall laser-welded steel tube. This metal tube is loosely filled with one or more optical fibers and a gel waterproofing material, and a protective tubular jacket of e.g. (foamed) high-density polyethylene (HDPE) surrounds the small diameter steel tube. In yet another cable embodiment, a number of polymer tubes, loosely filled with fibers and waterproofing material, is stranded around a central strength member, e.g., fiber reinforced plastic, in a helical way or in reverse lay stranding. A protective tubular jacket of e.g. high-density polyethylene (HDPE) surrounds this stranded construction.

The cable 32 is blown into the guide tube 18 using the cable blowing equipment 28, such as is described in U.S. Pat. No. 6,682,052 entitled "Optical Cable Installation with Mini-Bend Reduction," by Griffioen et al., which is assigned to the owner of the present invention, and is incorporated herein by reference. Immediately after the blowing equipment the cable lubricator 100 is placed, coupled to a lead-in section of the guide tube, and this lead-in section is extended, also by couplings, to the guide tube 18 into which the cable has to be installed.

Figure 7:
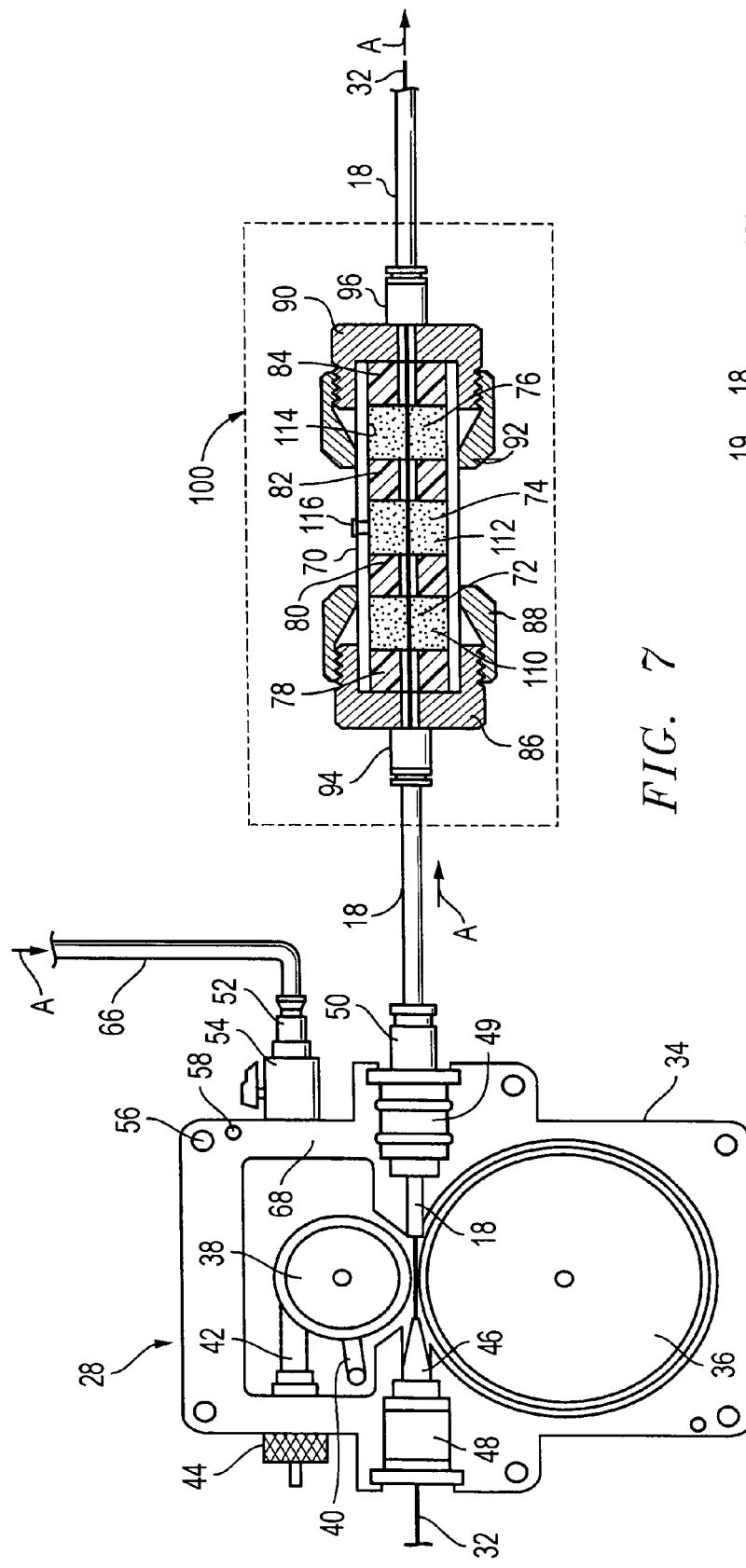
FIG. 7 is a simplified elevational view, partly in section, of conventional cable pushing/blowing equipment and an alternative embodiment of the lubricator shown in FIG. 1, without airflow bypass.

In the exemplary embodiment shown in FIG. 5 and FIG. 7 the cable lubricator 100 consists of a cylindrical sidewall section of high density polyethylene (HDPE) duct 70 with an outer diameter of 40 mm and an internal cylindrical bore 71 forming a lubrication compartment into which wiping members, for example compressed foam-plugs 72, 74, 76 (the size before compression, by a factor of about 3, shown in FIG. 6) and cylindrical cable guiders 78, 80, 82 and 84 are placed. The ends of the duct-housing 70 are closed air-tight (but not sealing the air flow in the longitudinal direction) using threaded duct-couplings 86, 88 and 90, 92 on which tubular connector fittings 94, 96 to the 4 mm guide tubes have been mounted.

In the preferred embodiment, a large fraction A1 of the pressurized airflow A is shunted or bypassed around the lubricator into the duct via T-connectors 98, 102, angled connectors 104, 106 and a bypass conduit 108. The smaller remainder fraction A2 of the pressurized airflow passes through the longitudinal airflow passage of the lubricator compartment 71 in contact with the foam-plug wiping members 72, 74 and 76.

The cable 32 is pushed through the cable lubricator 100 in wiping contact with the foam plug wiping members during blowing. To eliminate buckling of the cable in the relatively large space (compared to the 4 mm diameter guide tube) of the 40 mm diameter lubrication compartment 71, the cable is guided at several places within the compartment. The bore size of the 4 mm tube connectors 94, 96 and duct-coupling 86, 90 is formed a little larger than the cable, in this embodiment 2.5 mm. Wiping apertures 72A, 74A and 76A have been punched into the foam-plugs before mounting.

To further eliminate cable buckling, cylindrical guide blocks 78, 80, 82 and 84, made of a rigid plastic material such as nylon, are placed in the lubrication compartment in interleaved relation with the foam plugs. Radial deflection of the cable as it moves through the lubrication compartment is limited by passing the cable through guide apertures 78A, 80A, 82A and 84A formed through the cable guide blocks. Also here the size of the guide apertures in the cable guide blocks is 2.5 mm. The guide apertures have conical counterbore inlet pockets to ease pushing of a (new) section of cable through the cable lubricator. The longitudinal dimensions of the cable guide blocks 78, 80, 82 and 84 are chosen long enough such that tilting of the guide blocks in the duct housing 70 is avoided sufficiently to guide the cable without kinking. These lengths may be shorter when the cable guide blocks are supported and fixed in the lubricator.

The cable guide blocks 78, 80, 82 and 84 also divide or partition the cable lubricator compartment into separate subcompartments 110, 112 and 114. In this way it becomes possible to start with a "very wet" (saturated) foam-plug 72, in order to be sure that enough lubricant is applied and to provision the reservoir with as much lubricant as possible. The first compartment 110 could also contain lubricant only, without a foam-plug, and the last compartment 114 would contain a "just wet" foam-plug 76. The foam-plugs 74 in between can vary from "wet" to "dry."

Preferably, each foam plug is a little less "wet" starting from the first "wet" foam plug 72, thereby forming a lubrication gradient within the pressurized lubrication passage. The foam plugs also wipe excess lubricant from the cable as it moves through the lubricator. This arrangement provides a thin film of lubricant on the cable rather than a thick viscous layer that would cause the cable to stick to the duct sidewall. Also, this arrangement ensures a transfer of lubricant from the more-wet compartments to the less-wet compartments, thus avoiding prematurely drying out of the less-wet foam plugs.

Installation of the cable lubricator 100 is accomplished as follows. The T-connectors 98, 102, duct-couplings 86, 88, duct-housing 70, foam-plugs 72, 74, 76 and cable guiders 78, 80, 82, 84 are first shifted in order over the cable 32. Then the cable-guiders and the foam-plugs are pressed into the duct-piece (the foam-plugs have to be squeezed and compressed for proper fitting). Next the duct-couplings are screwed to the duct housing. Finally the air-bypass conduit is connected to the T-connectors to complete the cable lubricator. Then the cable 32 can be blown into guide tubes connected to the cable lubricator.

For new installations the cable 32 is cut in front of the cable lubricator 100 and a new lead-in section of guide tube is connected. When the cable reel is empty a new cable can be mechanically coupled to the old cable and pushed through the cable straightener 30, cable blowing equipment 28 and cable lubricator 100. It is also possible to use a straight rod, which is pushed through an empty cable lubricator without opening it, attach the cable to it, and then pull the cable through the lubricator.

When all lubricant is used or the foam wiping plugs become too dry to be effective, the cable lubricator can be opened and refilled through a sealable access port, for example via a screw cap fitting 116 (FIG. 3 and FIG. 4), mounted air-tight and extending through the bypass housing 130. It is also possible to use a lubricating nipple with an internal check valve for refill. The lubricant should be a viscous lubricating material that can flow and be absorbed into a fluid permeable applicator. Various lubricants are available from commercial sources and can be used for cable lubrication purposes. A water-based emulsion lubricant sold by American Polywater Corporation of Stillwater, Minn. under its trademark Polywater® Prelube™ 2000 is preferred. That lubricating material has the consistency of hand lotion under ambient conditions and is readily absorbed into open cell plastic foam materials, natural sponges, woven fiber wicks and other fluid permeable applicator materials.

Various materials can be used to fabricate the lubricant wiping plugs, including synthetic foams, natural sponges, woven fiber wicks and resilient gaskets made of natural or synthetic rubber. In the preferred embodiment, the preferred plug wiping material is resilient cellular plastic foam, such as open cell polyether or polyester polyurethane foam, rubber latex, and polyethylene or vinyl polymers. When a polyurethane foam is used, the foam has a nominal density in the range of about 0.6 to about 1.2, preferably about 0.8 to about 1.0 pounds per cubic foot, and an indentation force deflection (IFD) in the range of about 4 to about 15, preferably about 8 to about 12 pounds (Test Method ASTM D3574).

The nominal density in pounds per cubic foot (PCF) polyurethane foam plug material in one embodiment as measured according to ASTM D3574 is 0.5 to 5 PCF, in one embodiment 0.75 to 2 PCF, and in one embodiment 1.25 to 1.35 PCF. The foam firmness measured in terms of indentation force deflection (IFD) under ASTM D3574. Also, referred to as initial load deflection (ILD), for the foam plug material in one embodiment is 15 to 100 lbs., in one embodiment 45 to 55 lbs., and in one embodiment 50 to 52 lbs., respectively. Open cell foams, having the foregoing range of densities and ILD values are compressible under mechanical pressure and will return to their original shape when the pressure is removed.

The nominal density in pounds per cubic foot (PCF) polyurethane foam plug material in yet other embodiments as measured according to ASTM D3574 is in one embodiment 2 to 3 PCF and in one embodiment 6 to 9 PCF. The foam firmness is measured in terms of indentation force deflection (IFD) under ASTM D3574. Also, referred to as initial load deflection (ILD), for the foam plug material in those embodiments is in one embodiment 15 to 35 lbs., and in one embodiment 140 to 220 lbs., respectively.

The cable lubricator 100 can function well with bypass airflow A1 as shown in FIG. 3 and FIG. 5, applying a thin film of lubricant on the cable jacket. In these embodiments bypass airflow is provided by the conduit 108 that is coupled in parallel airflow relation with the lubricator airflow passage 71 for diverting substantially all of the pressurized airflow around the applicator and into the duct for blowing-assisted transport of the cable through the duct trajectory.

Bypass airflow is also provided by the alternative lubricator embodiment shown in FIG. 3 and FIG. 4. In this arrangement, the airflow bypass means is formed by a large diameter housing shell 130 that completely encloses the lubricator housing 70. The lubricator is radially spaced from the tubular housing and is held in cable-running alignment with the housing shell by radial spacer fins 132, 134 and 136. The annulus 138 between the housing shell and lubricator housing 70 forms a bypass airflow passage for conveying a large fraction A1 of the pressurized airflow from the launch apparatus 28 into the guide tube 18.

In this alternative embodiment the airflow passage of the lubricator is pressurized by a relatively small airflow A2. Only a single foam-plug absorbent applicator 72 is placed in the lubricant reservoir housing for wiping lubricant onto the cable 32 as it moves through the pressurized airflow passage 71. This arrangement may be used for running relatively stiff cable for which cable-guiders are not needed, e.g., fiber optic cable in which the fibers are enclosed in small diameter steel tubing.

It is also possible to block or eliminate the bypass airflow as shown in FIG. 7, whereby the entire pressurized airflow A is discharged through the lubricator 100. In that case a sufficient amount of pressurized air will still flow through the holes in the duct-couplings and cable-guiders, and also through the foam-plugs, to propel the cable through the guide tube.

With full airflow through the lubricator (FIG. 7), small lubricant droplets 120 are stripped away from the foam plugs and become entrained in the pressurized airflow as a "shower" of lubricant droplets, thus forming an aerosol mixture that lubricates the bore 19 of the guide tube 18 as the droplets disperse through the guide tube, as shown in FIG. 8. The nature of this "shower" depends on the air pressure, length of the guide tube in which the cable is installed and on the lubricant filling of the cable lubricator. Trial and error will determine the parameters for best lubricating effect by this method.

Figure 9:
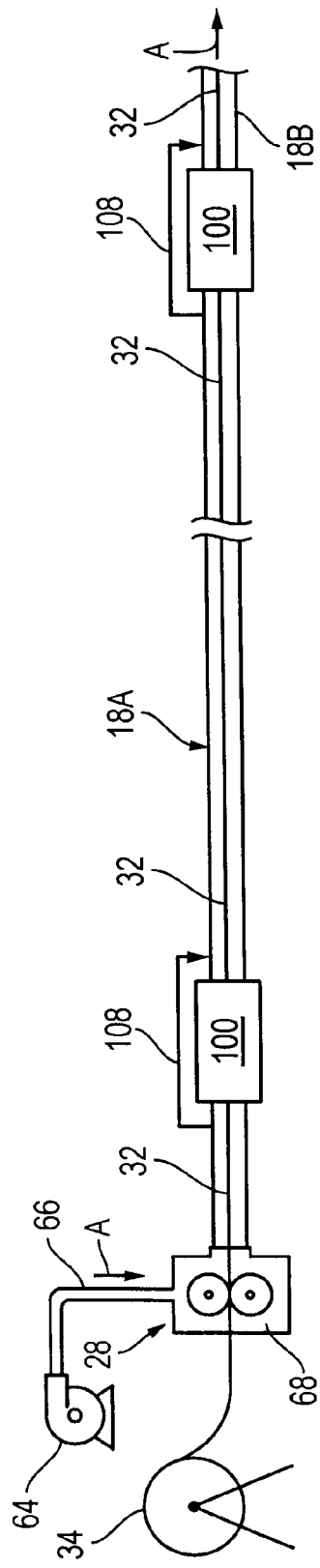
FIG. 9 is a simplified flow diagram showing a plurality of lubricators cascaded at spaced locations in a protective duct trajectory in which a cable is being installed by pushing and blowing equipment.

It is also possible, by using a splittable duct access fitting, to place one or more additional cable lubricators 100 further in the duct trajectory, for example in series with tandem duct sections 18A and 18B as shown in FIG. 9. In this cascade arrangement of lubricators, where the mechanical pushing forces provided by the initial cable launching equipment 28 may be absent or very small, the friction forces of the cable through the cable lubricator will be low enough to allow the viscous forces of the bypass airflow A1 to compensate for the reduced pushing force at the remote locations.

Figure 10:
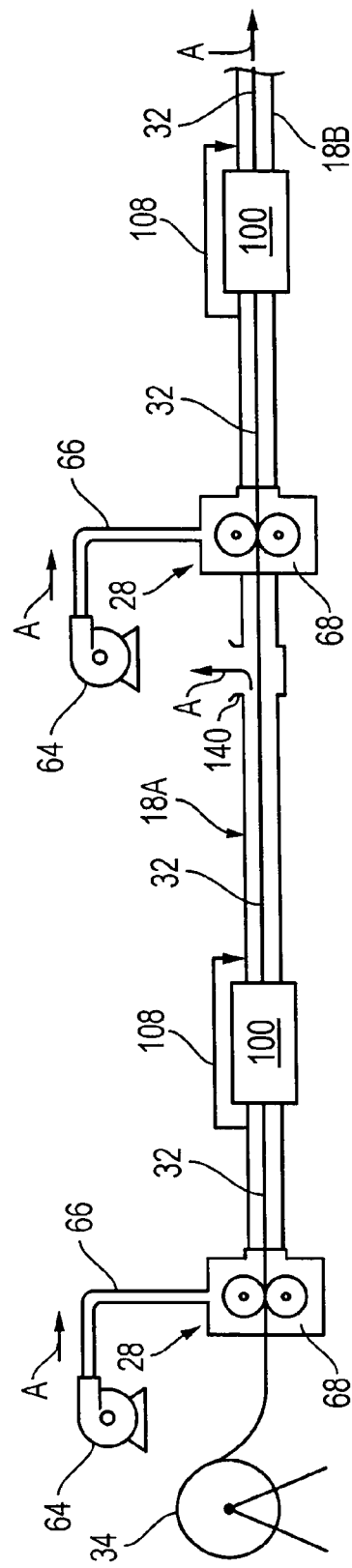
FIG. 10 is a simplified flow diagram showing a plurality of lubricators installed at spaced locations in a protective duct trajectory in which a cable is being installed by a cascaded installation of pushing and blowing equipment.

Also additional pushing/blowing equipment 28, 64 with an additional lubricator 100 can be placed further in the duct trajectory, blowing and lubricating in tandem (cascade). This can be done at one or more remote operative positions in the tandem duct sections 18A and 18B of the duct trajectory downstream of the initial cable launching equipment 28, as shown in FIG. 10. There is a vent fitting 140 installed in the duct section 18A just before reaching the second blowing station. The vent 140 exhausts the pressurized airflow A from the first blower out of the duct section 18A before it reaches the second duct section 18B.

According to this vented duct arrangement there is no airflow communication between the duct sections, since there is no practical way to combine the airflow from the first blower into the plenum of the second blower. The airflow and pushing forces from the first blowing station supplies the needed propelling forces for the cable over the first duct section 18A. The second launching apparatus will also propel the cable, but the new airflow provided by the second blower is only effective in the second duct section 18B, downstream of the second blower.

EXAMPLES

These tests were performed with the FIG. 5 lubricator embodiment (air bypass open). Blowing was done with 10 bars air-pressure unless otherwise specified. In all experiments the guide tubes were open at 585 meters from the point where the cable is launched.

Example 1

PBTP 2.0 mm Cable in Un-Lubricated Ribbed 4 mm Guide Tube

First attempt: Un-lubricated installation. Blowing transport of cable started with a rate of advance of 35 m/min but stopped because of frictional resistance after reaching only 50 m in the duct trajectory.

Second attempt: Lubricating the tube with water-based lubricant and a foam-plug blown through. Blowing transport of cable started with a rate of advance of 35 m/min and the speed had dropped to 7 m/min after reaching 225 m in the duct trajectory.

Third attempt: Using the cable lubricator (and another unlubricated tube). Blowing started with 35 m/min and the speed had dropped to 8 m/min after reaching 500 m in the duct trajectory.

Example 2

Nylon 1.8 mm Cable in Pre-Lubricated Ribbed 4 mm Guide Tube

First attempt: Installation with no further lubricating. Blowing started with 35 m/min and the speed dropped to 5 m/min at reaching 235 m in the duct trajectory.

Second attempt: Using the cable lubricator (and another unlubricated tube). Blowing started with 35 m/min and the speed was still the same upon reaching 585 m in the duct trajectory while the pressure was only 7 bars.

The effect of field lubrication during cable running with the pressurized cable lubricator 100 is an improvement by a factor of 10 or more in blowing length with respect to the non-lubricated case. Moreover the blowing results reproduce better when using the cable lubricator. The blowing distance improvement of the cable lubricator is also much more striking than the improvement of lubricating the guide tubes alone (or using pre-lubricated tubes), which was an unexpected and surprising improvement.

Figure 11:
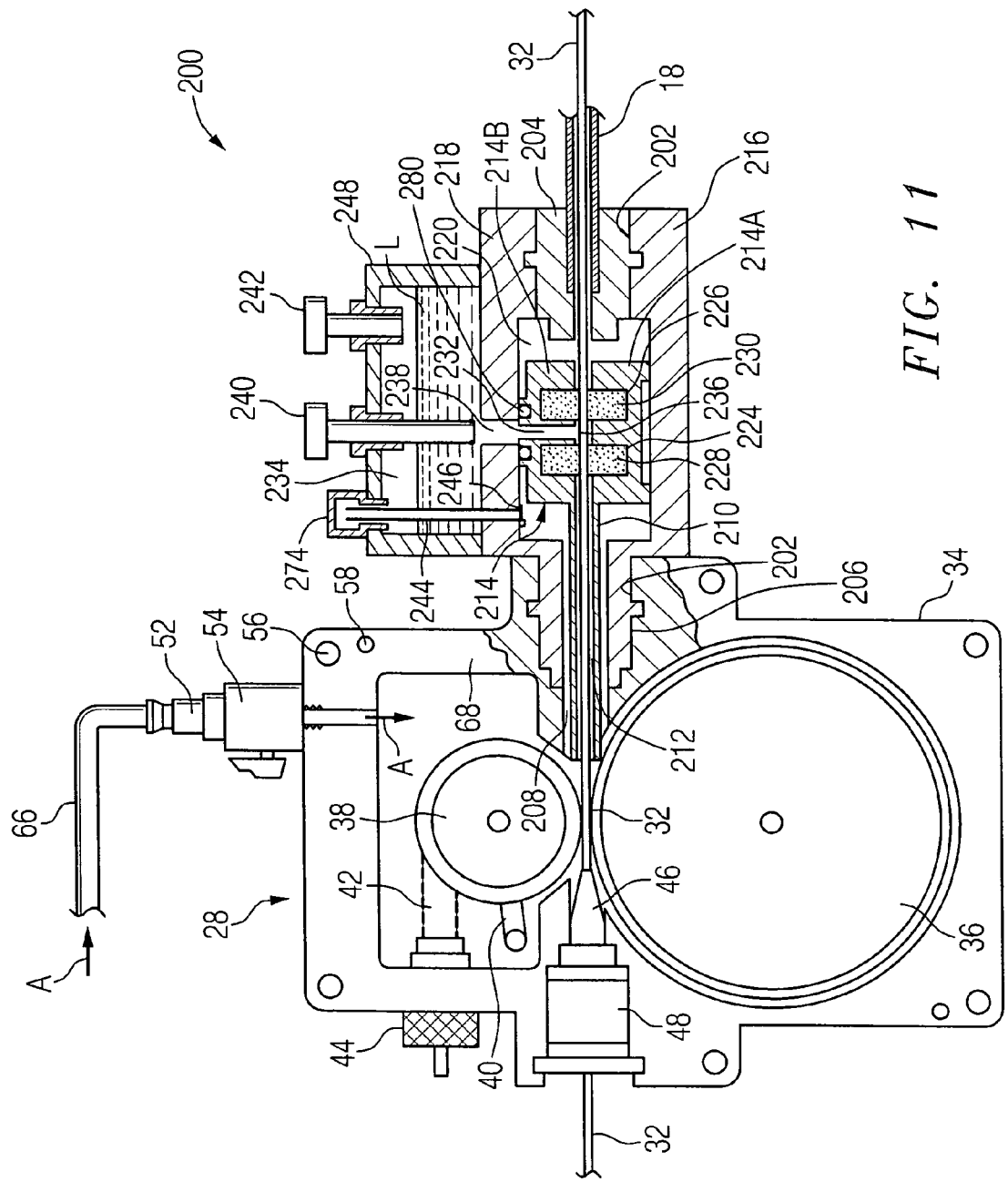
FIG. 11 is a simplified elevational view, partly in section, of an alternative embodiment of the lubricator shown in FIG. 1, with airflow bypass and an external lubricant reservoir, shown mounted in the operative position on conventional cable pushing/blowing equipment.

Referring now to FIG. 11, an alternative embodiment is illustrated in which a splittable cable lubricator 200 is integrated with a cable launching unit 28. A cable 32 is blown into a mini-duct branch guide tube 18 using the cable launching unit 28 as previously described. The cable launching unit 28 has a cable exit coupling port 202 for receiving a tube-clamping insert 204. According to this arrangement, however, the tube clamping insert is removed and the exit port 202 receives instead the splittable cable lubricator 200. For this purpose, the lubricator 200 is provided with a splittable coupling shaft 206, formed by a lower section 206A and an upper section 206B that are insertable into the exit port 202.

The coupling shaft 206 is intersected by a square profile airflow passage 208 through which an extension guide tube 210 extends. The extension guide tube 210 is formed by two semi-cylindrical sections 210A and 210B which are assembled together along the splitting plane P. The outer diameter of the assembled guide tube sections is substantially equal to the width of the square profile, thus providing for tangential touching engagement of the guide tube sections against the sidewalls of the airflow passage 208. The guide tube sections are intersected by an axially extending flow passage 212 which receives the cable 32 and conducts pressurized airflow A from the cable launching unit 28 into the lubricator.

Airflow passages 208 defined by the corner spaces between the extension guide tube 210 and the square profile sidewalls bypass pressurized airflow into an internal chamber 220 in which a cable lubricator assembly 214 is mounted. The cable extension guide tube 210 supports the cable 32 as it exits the launching unit and guides the cable as it enters the internal cable lubricator assembly 214 that is enclosed within the external housing portions 216, 218 of the lubricator 200.

Figure 12:
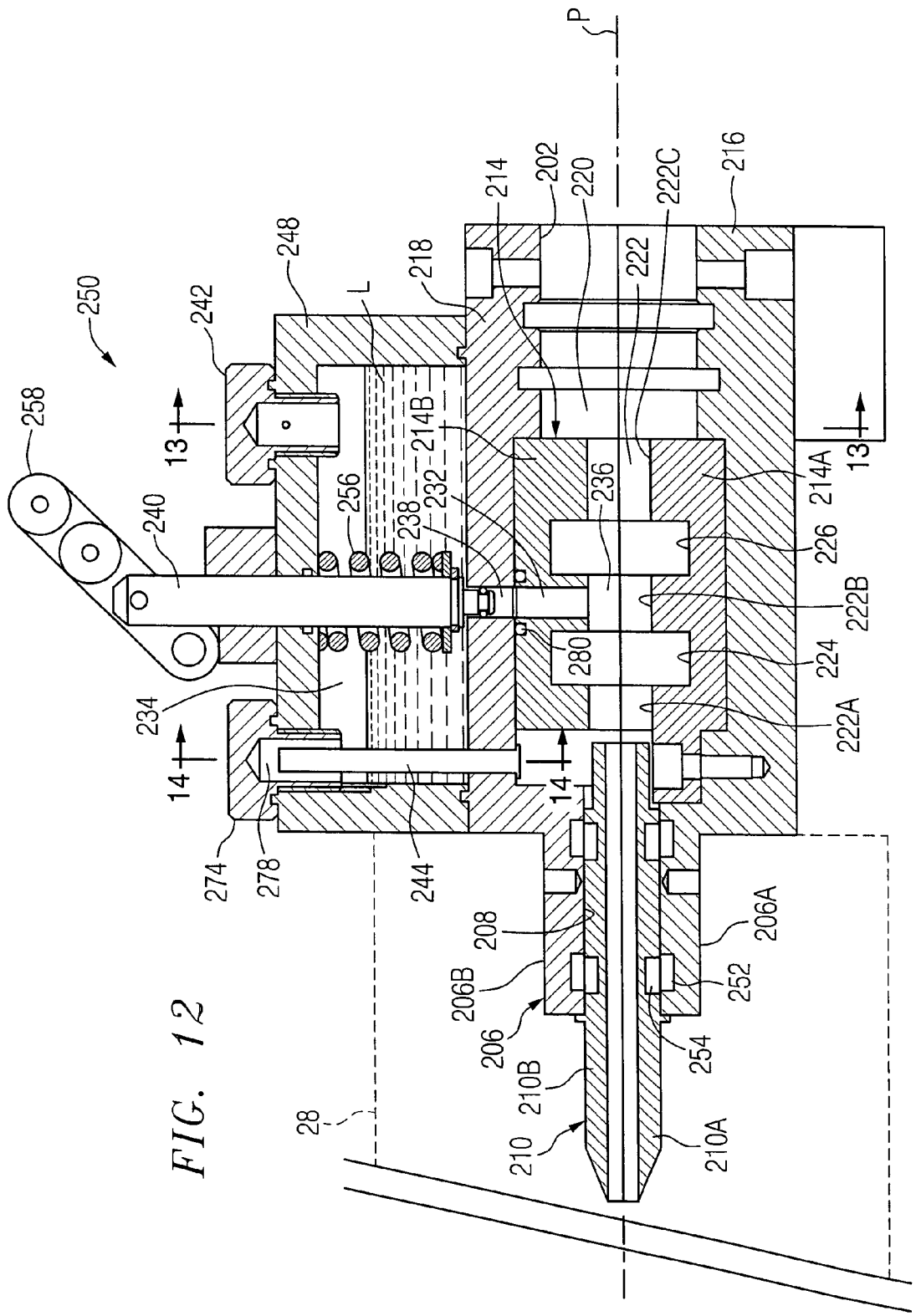
FIG. 12 is a simplified sectional view of the lubricator shown in FIG. 11, shown removed from the cable launching equipment, and with an improved external lubricant reservoir.

The splittable lubricator 200 includes a lower housing portion 216 and an upper housing portion 218 that are separable to allow initial loading of a cable 32 and mini-duct branch guide tube 18. As shown in FIG. 11 and FIG. 12, the splitting plane P of the lubricator is shown at right angles with respect to the splitting plane of the cable launching unit 28. The lubricator 200 can be rotated as desired to facilitate loading and assembly. The housing sections are then aligned and sealed together by tightening fasteners such that the planes coincide in the operative lubricating position during a cable launching operation.

The lubricator housing portions enclose an internal chamber 220 in which the cable lubricator assembly 214 is mounted. The cable lubricator assembly is also splittable, formed of a lower cable guide section 214A and an upper cable guide section 214 B. The guide sections are symmetrical, and are intersected by axial grooves 222A, 222B and 222C. When the guide sections are assembled and mated together as shown in FIG. 11, the aligned grooves form an axially extending passage 222 through which the cable 32 extends. The cable guide sections are also intersected by a pair of axially spaced, semi-cylindrical pockets 224, 226. Cylindrical foam plugs 228, 230 are received in the pockets for wiping against the cable as it moves through the lubricator.

The upper guide section 214B is further intersected by a lubricant supply passage 232 which conducts lubricant from an external reservoir 234 into a cable lubrication space 236 that forms a section of the cable passage 222. The passage 232 opens in fluid communication with the lubrication space 236 and fills the space with lubricant. By this arrangement, the cable 32 is continuously wetted with viscous lubricant L as it traverses the lubrication space 236 between the foam plugs.

The function of the foam plugs 228, 230 is to spread and wipe a thin film of the lubricant over the cable, and also to seal the lubrication space 236 in between them, which is filled with lubricant L. The external reservoir is enclosed within a reservoir housing 248 mounted on the upper lubricator housing 218. The lubricant L drains (under gravity) from the external reservoir 234 through a drain opening 238 in the upper housing, into the lubrication space 236 between the foam plugs. The supply passage 232 and the lubrication space 236 can be closed off from the reservoir 234 by means of a manual valve 240. When this valve is closed the external reservoir 234 can be refilled with lubricant during blowing operation through a fill port 242.

The foam plugs 228, 230 are preferably in the form of cylindrical disks made of a fluid permeable material, for example synthetic foams, natural sponges and woven fiber wicks as described above. The foam plugs are tightly compressed, e.g. by a factor of 1 to 3 when installed in the pockets 224, 226. Stiff cables may be simply pushed through the plugs during initial set-up. A piercing tool, for example a knitting needle, can be used to temporarily make a small opening in the foam plugs to allow pushing insertion of the cable 32.

During a cable launching operation, the fill port 242 is closed and the supply valve 240 is open. The air leaking through the foam plugs 228, 230 is sufficient to pressurize the external reservoir 234. When the blowing pressure is taken away, the residual air pressure acting on top of the lubricant in the reservoir 234 is relieved through a vent tube 244 to obtain pressure equalization in the reservoir. Venting is needed to avoid lubricant being forced to flow through the plugs 228, 230 by the pressure difference. The vent tube 244 is closed by a spring loaded ball valve 246, which opens in response to a small over-pressure of the reservoir 234. This allows complete closure of the reservoir 234 (when closing the drain opening 232 and supply valve 240) when the lubricator 200 is not used, avoiding drying out of the lubricant remaining in the reservoir.

To minimize cable buckling, the guide sections 214A and 214B are made of a durable, rigid plastic material such as nylon. Radial deflection of the cable 32 as it moves through the lubrication assembly 234 is limited by passing the cable through the guide apertures 222A, 222B and 222C formed through the cable guide sections. The size of the guide apertures in the cable guide sections is selected to provide close sliding support for the cable, for example 2.5 mm diameter. The guide apertures have conical counterbore inlet pockets to ease pushing of a section of cable through the cable lubricator. Preferably, the housing sections, the internal lubricator and other internal components are constructed of commonly used duct material, e.g. high-density polyethylene (HDPE), other injection moldable plastics, for example polyoxymethylene (polyacetal POM), or metal construction, for example aluminum.

The lubricator housing sections 216, 218 are radially inset from the lower and upper housing portions and the lubricator chamber 220 has sufficient volume such that enough airflow A from the cable launching apparatus 28 can bypass the internal lubricator assembly 214 through the annular flow passages between the internal lubricator and the housing sections to enable the blowing assisted launch of the cable 32 through the mini-duct branch guide tube 18. The cable passage 222 and the lubrication space 236 are maintained under positive pressure by pressurized airflow A entering into the extension guide tube 210.

The guide passage 222 inside the lubricator assembly 214 is narrow enough not to buckle the cable under the pushing forces resulting from the cable launching apparatus 28. Different cables may require different lubrication and guide passages, and may optionally include an extension guide tube 210 for the smallest cables, where risk of buckling is largest. The splittable tube lubricator clamping insert 204 is inserted into the exit port 202 and provides a connection coupling for the mini-duct branch guide tube 18. The cable 32 is completely lubricated with a thin film of lubricant L as it enters the branch guide tube 18.

Figure 13:
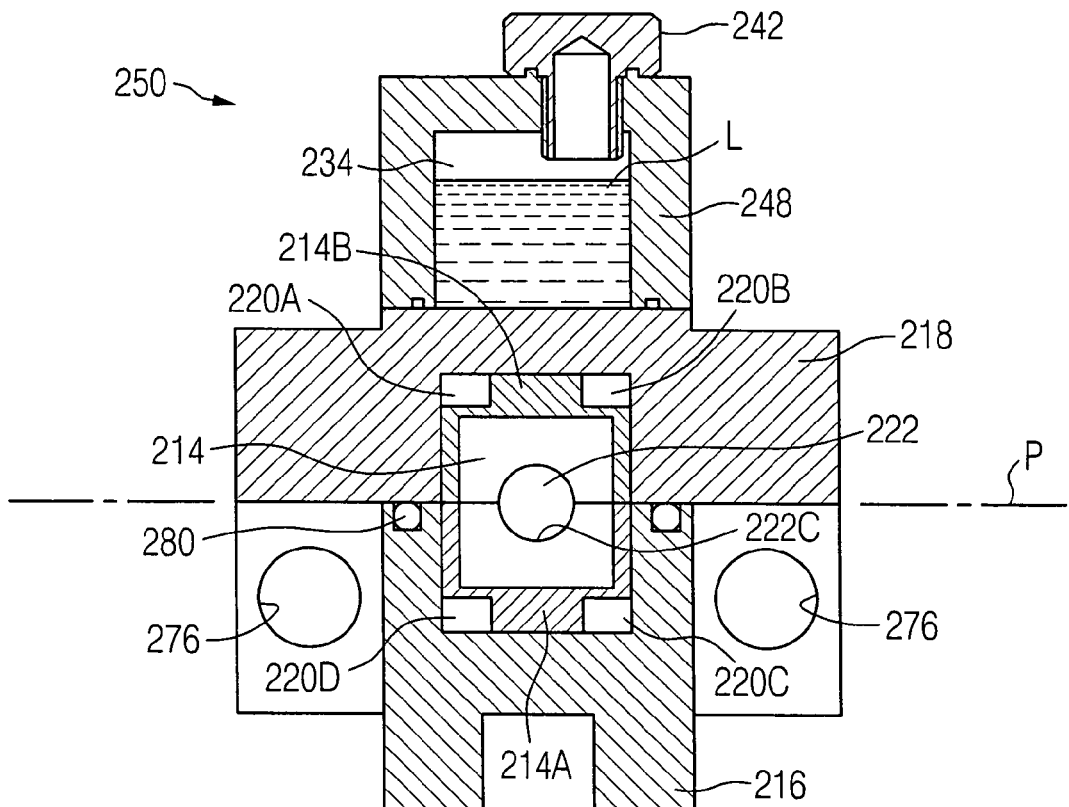
FIG. 13 is a sectional view of the internal lubricator assembly shown in FIG. 11 and FIG. 12.
Figure 14:
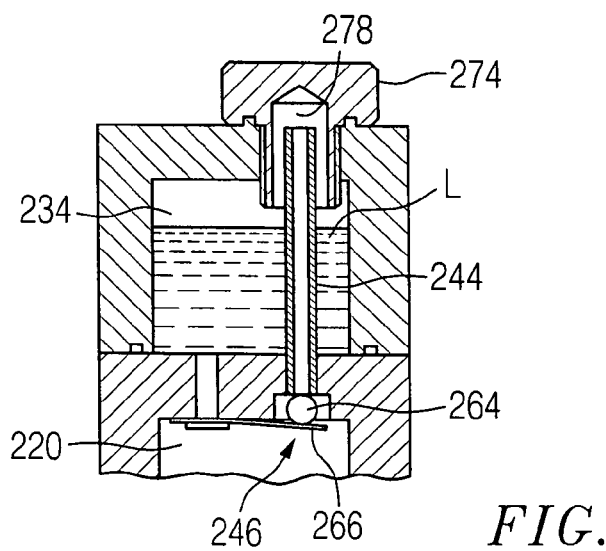
FIG. 14 is a sectional view of a portion of the air pressure relief valve shown in FIG. 11 and FIG. 12.

Referring now to FIG. 12, FIG. 13 and FIG. 14, a lubricator 250 according to a modified embodiment of the lubricator 200 is shown with a splittable housing consisting of a lower part 216 and an upper part 218, that can be inserted into a cable blowing apparatus 28 (only partly shown), using the splittable insert coupling shaft 206. The cable (not shown) is received from the cable blowing apparatus into the housing directly through the passage 208 or optionally through an extension guide tube 210 as shown in FIG. 11.

When the optional extension guide tube 210 is used, the extension components are mounted close to the cable drive wheels (shown in FIG. 11) of the cable blowing apparatus, in order to avoid buckling of the cable. The upper and lower sections 210A and 210B of the extension guide tube 210 are held in place during initial set-up and assembly using magnetic fasteners 252, 254. The mini-duct branch guide tube (not shown) is fixed using shells (not shown) that are placed in the cylindrical exit port 202. The lubricator chamber 220 (see cross-sectional view FIG. 13) has a square profile, and the lower and upper parts 214A, 214B of the internal lubricator provide corner passages 220A, 220B, 220C and 220D for by-passing the airflow A from the cable blowing apparatus 28 into the mini-duct branch guide tube 18.

The splittable external housing 216, 218 encloses an internal chamber 220 in which a splittable internal lubricator housing 214, consisting of lower part 214A and upper part 214B, is fixed using magnetic fasteners (not shown). Portions of the internal lubricator housing are inset from the external housing so that pressurized air A is bypassed through internal passages 220A, 220B, 220C and 220D, see cross-sectional view FIG. 13. Inside the internal splittable lubricator housing 214 two foam plugs 228, 230, in the form of cylindrical disks similar to those shown in FIG. 6, are packed into small cylindrical pockets 224, 226.

In the lubrication space 236 between the foam plugs, viscous lubricant L is received through the supply channel 232 and drain channel 238 from an external reservoir 234 contained by a reservoir housing 248 that is mounted on the upper housing section 218. Because the lubricant L in the lubrication space 236 is sealed between the foam plugs, only a thin film of lubricant is taken with the cable 32 as it is wiped by the foam plugs. The supply passage 238 can be closed with the valve 240, which is biased for closure by a compression spring 256 and can be manually opened by a handle 258 which seats and unseats the valve 240.

Figure 15:
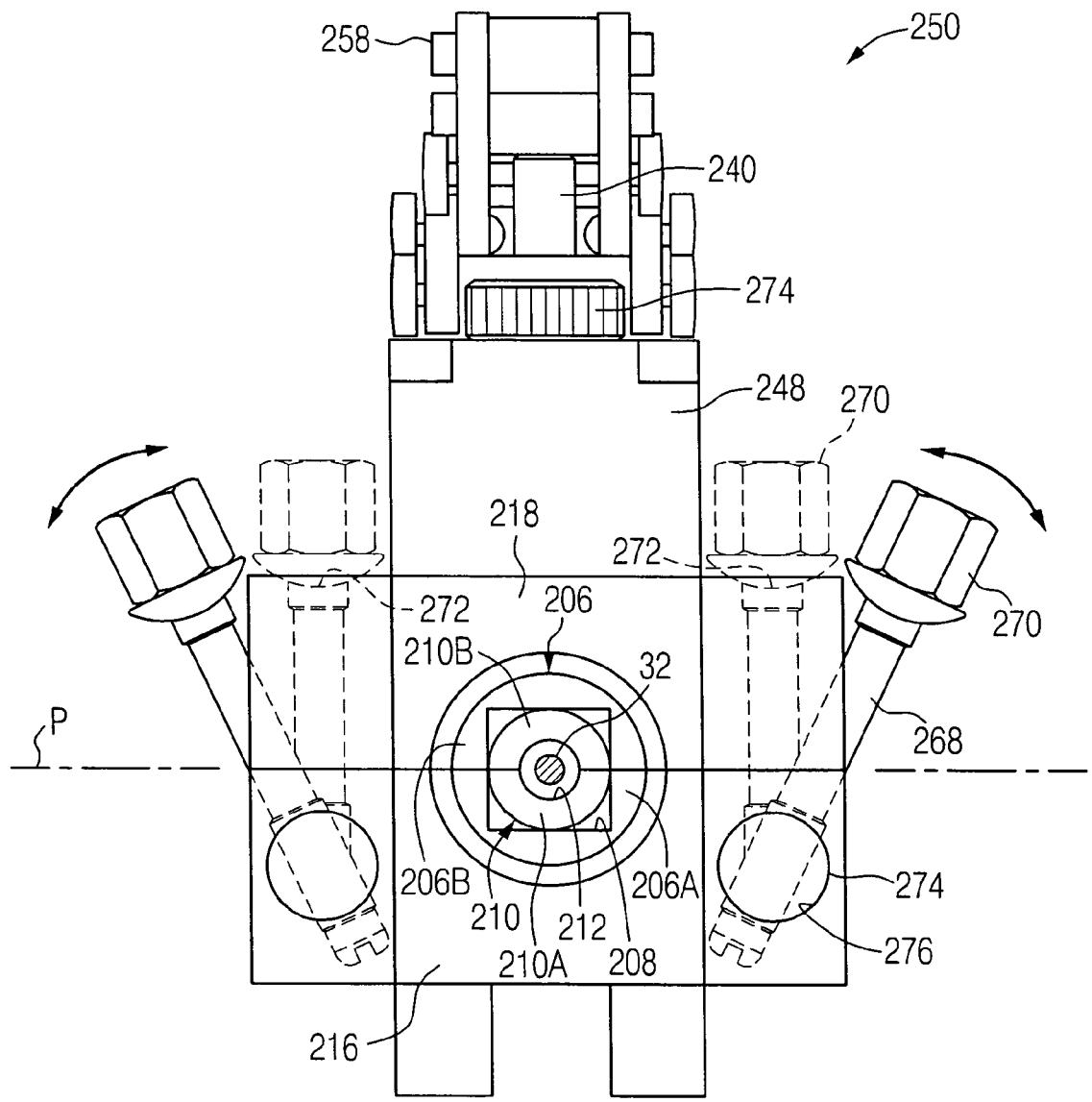
FIG. 15 is a rear elevational view (at the connection to the cable launching equipment) of the lubricator assembly of FIG. 12.

Referring to FIG. 15, the lower part and upper part of the splittable housing are closed using bolts 268 and nuts 270, with the nuts being nested in a conical space 272 in the upper housing section when placed in the locked position. The bolts 268 are attached to an axle 274 which is mounted for pivotal movement in holes 276 in the lower housing section 216 on laterally opposite sides of the splittable housing. In this way a three-point clamping union is achieved as described in European Patent EP 1548347 (Griffioen), which is incorporated herein by reference.

The cap 274 can be removed to refill the reservoir 234 with fresh lubricant L. This can be done during blowing operation (with air pressure inside the internal chamber 220) when the supply valve 240 is in the seated (valve closed) position. An air pressure relief tube 244 (see cross-sectional view FIG. 14), extends from the reservoir 234 through upper housing section into the internal vent chamber 278.

The lower end of the air pressure relief tube is closed with a ball valve 264 which is biased to the seated (valve-closed) position by a spring-plate 266. In this way, air cannot leak from the internal chamber 220 into the reservoir 234, which enables reservoir filling during blowing operation. The valve 264 opens automatically as differential pressure overcomes the bias force exerted by the spring-plate. This allows high pressure air to escape from the lubricant reservoir 234, when the pressure in the blowing operation is decreased. This will avoid relative air pressure build-up in the reservoir that would force the lubricant L through the foam plugs 228, 230 into internal chamber 220 when the air pressure is taken away. In order to release air A, and not lubricant L, the relief tube extends into a vent space 278 inside the closure cap 274, which is located well above the liquid lubricant level.

When installing the lubricator 200 or the lubricator 250 in the operative position on the cable blowing apparatus 28, first the lower external housing section 216 is inserted into the lower housing section 34 of the cable blowing apparatus. Then the lower section of the internal lubricator housing 214A is placed inside lower housing section 216. Next the cable 32 is placed in the cable blowing equipment and in the half-channel sections 222A, 222B and 222C of the internal lubricator. After this, the upper housing section 218 of the external lubricator housing is placed on top of the lower housing section 216. Magnetic fasteners (not shown) ensure that the upper housing section remains in place. This stabilization is also needed while pressing the foam plugs into the pockets 224, 226.

Next the upper housing section 218 (with the external reservoir housing 248 already mounted) is placed on top of lower housing section 216. After this, the annular O-ring seal 280 closes the internal lubricant supply passage from leaking into the internal chamber 220. Finally, after the lubricator housing sections are properly aligned with the cable blowing apparatus, the bolt and nuts of both cable blowing apparatus and cable lubricator are tightened. During mounting and dismounting of the cable lubricator, but also during storage, the valve 240 and caps 242 and 274 are closed (the ball valve 246 closes by itself). By this arrangement no lubricant can drip out the reservoir and also drying out of the lubricant is avoided.

Figure 16:
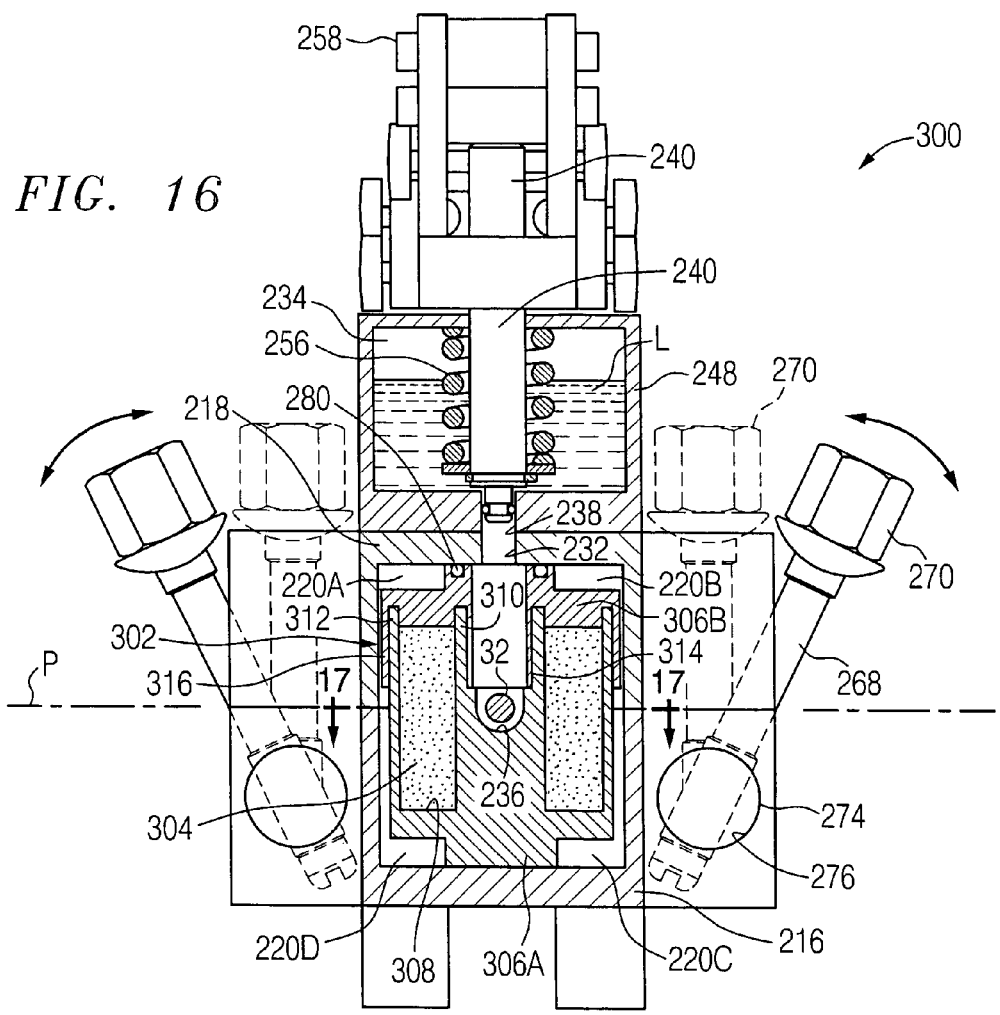
FIG. 16 is a sectional view of an alternative embodiment of the internal lubricator assembly in which a single annular foam plug applies lubricant to a cable and seals the lubrication space.
Figure 17:
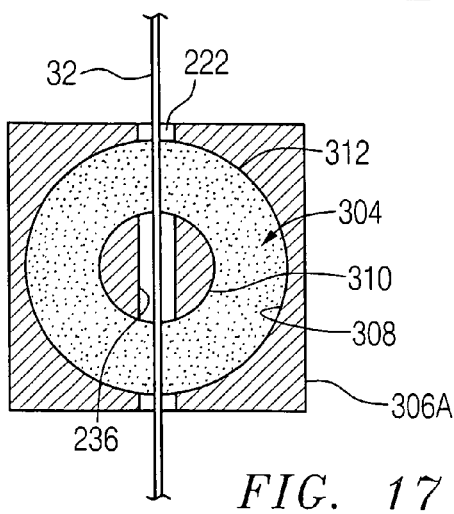
FIG. 17 is a sectional view thereof, taken along the line 17-17 of FIG. 16, showing the placement of a cable in the internal lubricator, in which the annular foam plug is disposed in wiping engagement the cable, which penetrates through opposite sides of the foam plug.
Figure 18:
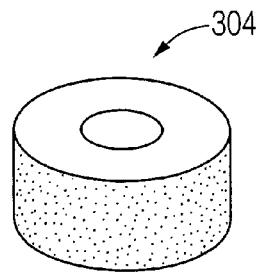
FIG. 18 is a perspective view of the annular foam plug that is installed in the lubricator of FIG. 16 and FIG. 17.

Yet another embodiment of the lubricator is shown in FIG. 16, in which a lubricator assembly 300 is provided with a splittable internal lubricator 302 that is fitted with a single wiping member 304 in the form of an annular plug of open cell foam material. In this embodiment, the internal lubricator housing 306 is formed by a lower housing section 306A and an upper housing section 306B. The lower housing section 306A is intersected by an annular pocket 308 for receiving the annular foam plug 304. The lower housing section has upstanding, radially spaced cylindrical sidewalls 310 and 312, continuing the annular space 308 for the foam plug. Both cylindrical walls contain vertical slots (not shown) in order to make it possible to place the cable 32 (FIG. 17) and remove it afterwards, without cutting the cable. The slots preferably extend to a longitudinal channel that is cut into communication with the cable passage 222 in the lower housing section 306A.

The upper housing section 306B has depending, radially spaced cylindrical sidewalls 314, 316 that are dimensioned for sliding, telescoping engagement with the lower cylindrical sidewalls 312, 214. The splittable internal lubricator housing is closed by placing the upper housing sidewalls and lower housing sidewalls into telescoping engagement, which completely encloses the annular plug pocket 308. The bottoms of the cylindrical sidewalls close off the cable passage 222, preventing cable buckling. The overlapping cylindrical walls also close off the vertical slots. Lubricant L is received from the external lubricant reservoir 234 through the supply passages 232, 238 into the lubricator channel space 236, where the cable 32 (shown in FIG. 17) is wetted by surface contact with the lubricant, and is further wiped by the annular foam plug 304, leaving only a thin film of lubricant L on the cable as it moves out of the exit port 204.

Referring now to FIG. 19-FIG. 24, a lubricator 350 is provided for lubricating a loose bundle 352 of four guide tubes 352A, 352B, 353C and 352D. These guide tubes have a diameter OD/ID of 12/9.6 mm and are pushed through an existing tubular conduit or protective duct 354 by a powered tractor and are propelled through the duct by the volumetric flow of compressed air A which is introduced into the inlet end of the duct. Preferably, the pushing and blowing operation is performed as described in U.S. Pat. No. 6,572,081 by Griffioen et al., entitled "Installation of Guide Tubes in a Protective Duct," which is commonly owned by the assignee of the present application, and is incorporated herein by reference. The guide tubes are preferably pressurized and closed at their leading end and trailing end. The protective duct 354, which has a diameter OD/ID of 40/33 mm, is open at both ends.

First the guide tubes (and the pressurized air A) travel a short section (e.g., about 1-10 m) through the protective duct 354 before reaching the bundle lubricator 350, in which one end of the protective duct is clamped airtight within a splittable external housing 356. In FIG. 19, only the lower half-section 356A is illustrated. The upper housing section 356B and the lower housing section 356A are shown assembled in FIG. 22. The housing sections are tightly sealed together by bolts 268 and nuts 270. The bundle lubricator has a guide tube entry coupling port 358 and an exit coupling port 360 for receiving a splittable duct-clamping inserts 362, 364, respectively. Each duct-clamping insert is formed in two mating half-sections which fit together and nest within the entry and exit ports. In this splittable external housing, a splittable internal lubricator housing for accommodating a single, large cable can be installed if desired (not shown).

In this bundle lubricator embodiment, a non-splittable, internal lubricator assembly 366, shown in FIG. 19 and FIG. 21, provides guiding support and lubrication for the four guide tubes. The splittable external housing 356 encloses an internal chamber 368 in which the internal lubricator assembly 366 confined. Rib portions 370, 372, 374 and 376 maintain the internal lubricator assembly radially inset from the external housing so that pressurized air A is bypassed through longitudinal passages 368A, 368B, 368C and 368D, see cross-sectional view FIG. 22. Inside the internal lubricator assembly 366 two foam plugs 378, 380, in the form of cylindrical foam disks similar to those shown in FIG. 6, are packed into cylindrical pockets 382, 384. The foam plugs are saturated with lubricant L. The foam plugs are intersected by four cylindrical passages 380A through which the guide tubes pass in wiping engagement with the plugs.

The pockets 382, 284 are disposed on opposite sides of a cylindrical guide block 386 that is intersected by four central apertures 388, 390, 392 and 394 through which the guide tubes pass. End caps 396, 398 are mounted on opposite ends of the guide block. A gasket seal assembly 405, 407 is mounted on the end caps that seal the pockets 382, 384. Each seal assembly is intersected by matching sets of central apertures 400, 402, 404 and 406 that are positioned in axial alignment with the guide block apertures 388, 390, 392 and 394. Annular seal gaskets 408, 410, 412 and 414 are mounted in the central apertures for wiping the guide tubes and sealing the pockets 382, 384 to prevent leakage of viscous lubricant L out of the pockets. The guide block 386, the seal assemblies and the end caps oppose buckling of the guide tubes as they pass through the lubricator. The end caps also engage against radially projecting shoulder portions 416, 418 of the external housing which stabilizes the axial position of the internal lubricator assembly.

Optionally, the foam plugs 378, 380 can be removed and the pockets can be filled with liquid lubricant L which wets the guide tubes as they move through the lubricator 366. The annular seal gaskets 408, 410, 412 and 414 wipe excess lubricant from the guide tubes and seal the pockets against leakage.

It is also sometimes desirable to blow in bundles of cables into protective ducts. For this purpose the bundle lubricator 350 shown in FIGS. 19-24 can also be used, for lubricating a bundle of 4 cables of 12 mm diameter, as the bundle is blown into a duct, for example the protective duct 354.

An example to show the improvement of using the FIG. 19 bundle lubricator 350 for installing a bundle of longitudinally extending members (guide tubes) is given below:

Example 1

4 HDPE Guide Tubes 12/9.6 mm in a Lubricated Ribbed 40/33 mm Protective Duct

First attempt: Installation in field trajectory without lubricator; protective duct was lubricated with water-based lubricant and a foam-plug was blown through. Blowing transport of guide tubes started with a rate of advance of 24 m/min with a blowing pressure of 3.2 bars and came to a stand-still after reaching 808 m in the duct trajectory, with a blowing pressure of 7.3 bars.

Second attempt: Installation on 1.8 m drum with duct (which is more difficult than blowing in a field trajectory), with bundle-lubricator 350 and protective duct lubricated with water-based lubricant and a foam-plug blown through. Blowing transport of guide tubes started with a rate of advance of 34 m/min with a blowing pressure of 3.5 bars and reached 950 m (end of duct) with a rate of advance of 38 m/min, with a blowing pressure of 6.2 bars.

An example to show the improvement of using the FIG. 11 lubricator embodiment 200 (using an external lubricant reservoir) is given below:

Example 2

HDPE 5.0 mm Cable in Un-Lubricated Ribbed 10 mm Guide Tube

First attempt: Installation with lubricator 100 shown in FIG. 5 and microduct un-lubricated. Blowing transport of cable started with a rate of advance of 78 m/min with a blowing pressure of 6 bar but dropped below 20 m/min, even though the blowing pressure was increased to 12 bar, because of frictional resistance after reaching 840 m in the duct trajectory.

Second attempt: Installation with new lubricator (lubricator 200 with external lubricator shown in FIG. 11) and microduct un-lubricated. Blowing transport of cable started with a rate of advance of 90 m/min with a blowing pressure of 6 bar and was still running at 20 m/min, now with the blowing pressure increased to only 10 bar, after reaching 1500 m in the duct trajectory.

Third attempt: Installation with the lubricator 200 shown as in FIG. 11 and microduct lubricated with water-based lubricant and a foam-plug blown through. Blowing transport of cable started with a rate of advance of 105 m/min with a blowing pressure of 6 bar and was still running at 15 m/min, without increasing the blowing pressure, after reaching 1500 m in the duct trajectory. When increasing the blowing pressure to 10 bar the rate of advance increased to 87 m/min.

The blowing distance improvement of the cable lubricator with external reservoir is also much more striking than the conventional method of lubricating the guide tubes alone (or using pre-lubricated tubes). If the non-lubricated cable is blown into an unlubricated guide tube, without a low-friction liner or without pre-lubrication, tests demonstrate that the resulting blowing distance may reach only as low as 10% of the possible distance on the same trajectory under optimum lubrication using the FIG. 11 lubricator 200 or the FIG. 12 lubricator with external lubricant reservoir. Experimental results are summarized in Table 1 shown below:

TABLE 1

|  | Cable | |
| --- | --- | --- |
| Guide Tube | No lubrication | Cable lubricator with external reservoir (FIG. 11 or FIG. 12 embodiment) |
| No lubrication | 10-30% | 50-70% |
| Liner or pre-lube | 50-70% | 70-90% |
| Field lubrication just before the cable is being launched | 60-80% | 100% |

For the sake of completeness, it is further noted that the lubrication apparatus and method of the invention are suitable for installing copper wire cables and power cables as well as optical fiber cables.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

We claim:

1. A lubricator for applying lubricant to a longitudinally extending member as the member is being propelled at least in part by pressurized air blowing-assisted transport through a duct, comprising:
a housing forming a lubrication passage for conveying pressurized air and allowing movement of a longitudinally extending member through the lubricator;
a lubricant reservoir coupled in fluid communication with the lubrication passage for supplying a viscous lubricant into the lubrication passage for wetting a longitudinally extending member with viscous lubricant as the member moves through the lubrication passage; and
the housing having a bypass airflow passage in parallel airflow relation with the lubrication passage, thereby diverting a portion of the pressurized airflow around the lubrication passage for discharge into the duct.

2. A lubricator according to claim 1, characterized in that the longitudinally extending member is a cable selected from the group consisting of optical fiber cables, copper cables, coaxial cables, balanced pair cables and power cables.

3. A lubricator according to claim 1, characterized in that the longitudinally extending member is a channelizing member selected from the group consisting of guide tubes, mini-tubes, mini-ducts, subducts and microducts.

4. A lubricator according to claim 1, characterized in that the lubricant reservoir comprises an external compartment for containing a volume of viscous lubricant, and a sealable refill access port is coupled to the lubrication compartment for replenishing lubricant therein.

5. Apparatus for installing a longitudinally extending member in a duct characterized by:
a launching apparatus including a source of pressurized air for propelling a longitudinally extending member at least in part by pressurized air blowing-assisted transport in a duct,
a lubricator connected in an operative position between the launch apparatus and the duct, the lubricator including a housing forming an airflow passage for conveying pressurized air into the duct and for guiding a longitudinally extending member from the launch apparatus through the airflow passage into the duct, means disposed in the housing for wetting the member with a viscous lubricant as it moves through the airflow passage, and a wiping plug disposed in the lubricator for wiping contact with a longitudinally extending member as it moves through the airflow passage; and
the housing having a bypass airflow passage in parallel airflow relation with a lubrication passage, thereby diverting a Portion of the pressurized airflow around the lubrication passage for discharge into the duct.

6. Apparatus for installing a longitudinally extending member as set forth in claim 5, wherein the launching apparatus comprises an exit port through which a longitudinally extending member is transported and pressurized air is conveyed, and the lubricator housing comprises an inlet coupling portion for admitting pressurized airflow and a longitudinally extending member into the airflow passage, the inlet coupling portion including a coupling shaft that is removably inserted into the exit port of the launching apparatus, and the coupling shaft is intersected by an axial transport passage through which a longitudinally extending member can be transported, and the axial transport passage connecting the lubricator airflow passage in air flow communication with the launching apparatus.

7. Apparatus for installing a longitudinally extending member according to claim 5, the lubricator including:
guide means disposed in the lubricator housing for limiting radial deflection of a longitudinally extending member as it moves through the lubricator airflow passage.

8. A lubricator for applying a lubricant to a longitudinally extending member as it is being propelled at least in part by pressurized air blowing-assisted transport through a duct, comprising in combination:
a housing forming an airflow passage for conveying pressurized air into the duct and for guiding a longitudinally extending member through the airflow passage into the duct;
a reservoir mounted on the lubricator housing for containing a volume of viscous lubricant;

means connecting the reservoir in fluid communication with the airflow passage for supplying viscous lubricant into the airflow passage for wetting contact with a longitudinally extending member moving through the airflow passage, a plug of wiping material disposed in the airflow passage for opposing leakage of viscous lubricant out of the airflow passage and for wiping contact with a longitudinally extending member moving through the airflow passage; and the lubricator including housing means partitioning the airflow passage into a first compartment, a last compartment and an intermediate compartment disposed between the first compartment and last compartment, wherein the reservoir connecting means comprises a drain passage coupled in fluid communication with the intermediate compartment, and a fist plug of wiping material is disposed in the first compartment for opposing leakage of lubricant, and a second plug of wiping material is disposed in the last compartment for wiping excess lubricant from a longitudinally extending member as it moves through the airflow passage.

9. A lubricator for connection in an operative position between a source of compressed air and a duct through which a longitudinally extending member is being propelled at least in part by pressurized air blowing-assisted transport, the lubricator comprising:

a housing forming an airflow passage for conveying pressurized air from the source into the duct, and means disposed in the housing for wetting a longitudinally extending member with viscous lubricant as it moves through the pressurized airflow passage, and means disposed in the pressurized airflow passage for wiping excess lubricant from the cable; and the housing having a bypass airflow passage in parallel airflow relation with the lubrication passage, thereby diverting a Portion of the pressurized airflow around the lubrication passage for discharge into the duct.

10. A lubricator as set forth in claim 9, further comprising means disposed in the airflow passage for opposing leakage of lubricant out of the airflow passage.

* * * * *